US012625873B2

(12) United States Patent
Arnulf

(10) Patent No.: US 12,625,873 B2
(45) Date of Patent: May 12, 2026

(54) SYSTEM AND METHOD FOR GENERATING DATA VISUALIZATION SCORES FOR USE WITH A DATA ANALYTICS ENVIRONMENT

(71) Applicant: ORACLE INTERNATIONAL CORPORATION, Redwood Shores, CA (US)

(72) Inventor: Benjamin Arnulf, Naples, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/935,227

(22) Filed: Nov. 1, 2024

(65) Prior Publication Data

US 2025/0217372 A1    Jul. 3, 2025

Related U.S. Application Data

(60) Provisional application No. 63/615,732, filed on Dec. 28, 2023.

(51) Int. Cl.
*G06F 16/2457* (2019.01)
*G06F 16/26* (2019.01)

(52) U.S. Cl.
CPC ........ *G06F 16/24578* (2019.01); *G06F 16/26* (2019.01)

(58) Field of Classification Search
CPC .......................... G06F 16/24578; G06F 16/26
See application file for complete search history.

(56) References Cited

U.S. PATENT DOCUMENTS

| | | |
|---|---|---|
| 2014/0071138 A1 | 3/2014 | Gibson |
| 2018/0004811 A1 | 1/2018 | Keahey |
| 2019/0005104 A1* | 1/2019 | Prabhu ................... G06Q 30/02 |

FOREIGN PATENT DOCUMENTS

WO        20220248036        12/2022

OTHER PUBLICATIONS

European Patent Office, International Searching Authority, Notification of Transmittal of The International Search Report and The Written Opinion of The International Searching Authority, or The Declaration dated Mar. 24, 2025 for International Patent Application No. PCT/US2024/061688 , 11 pages.

* cited by examiner

*Primary Examiner* — Jay A Morrison
(74) *Attorney, Agent, or Firm* — TUCKER ELLIS LLP

(57)        ABSTRACT
Embodiments described herein are generally related to systems and methods for generating data visualization scores, for use with data analytics environments. In accordance with an embodiment, the system can operate in the manner of an expert system, or according to a series of processes or rules, to examine a data visualization of interest, compare a list of found elements with element types specified by an analytics data visualization score matrix, and generate, based on matching found elements with the analytics data visualization matrix, a data visualization score associated with the data visualization. In accordance with an embodiment, the system can operate as a data visualization advisor, during preparation of a data visualization, to provide a user with recommendations or score values indicative of a quality or complexity of their data visualization, which may be helpful in improving their data visualization, for example from a beginner-level to a more advanced-level.

12 Claims, 23 Drawing Sheets

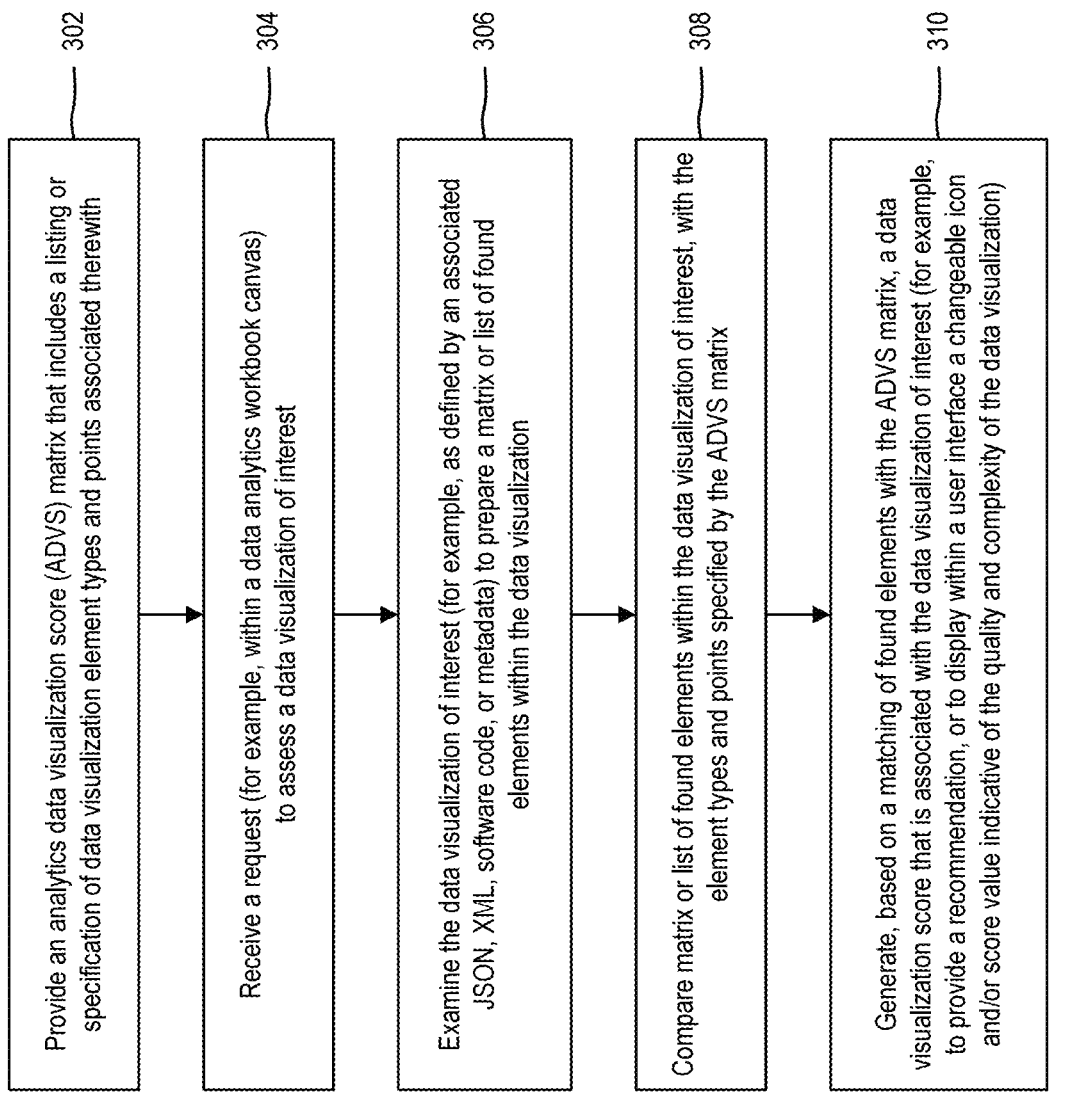

302 — Provide an analytics data visualization score (ADVS) matrix that includes a listing or specification of data visualization element types and points associated therewith 304 — Receive a request (for example, within a data analytics workbook canvas) to assess a data visualization of interest 306 — Examine the data visualization of interest (for example, as defined by an associated JSON, XML, software code, or metadata) to prepare a matrix or list of found elements within the data visualization 308 — Compare matrix or list of found elements within the data visualization of interest, with the element types and points specified by the ADVS matrix 310 — Generate, based on a matching of found elements with the ADVS matrix, a data visualization score that is associated with the data visualization of interest (for example, to provide a recommendation, or to display within a user interface a changeable icon and/or score value indicative of the quality and complexity of the data visualization)

*FIGURE 10*

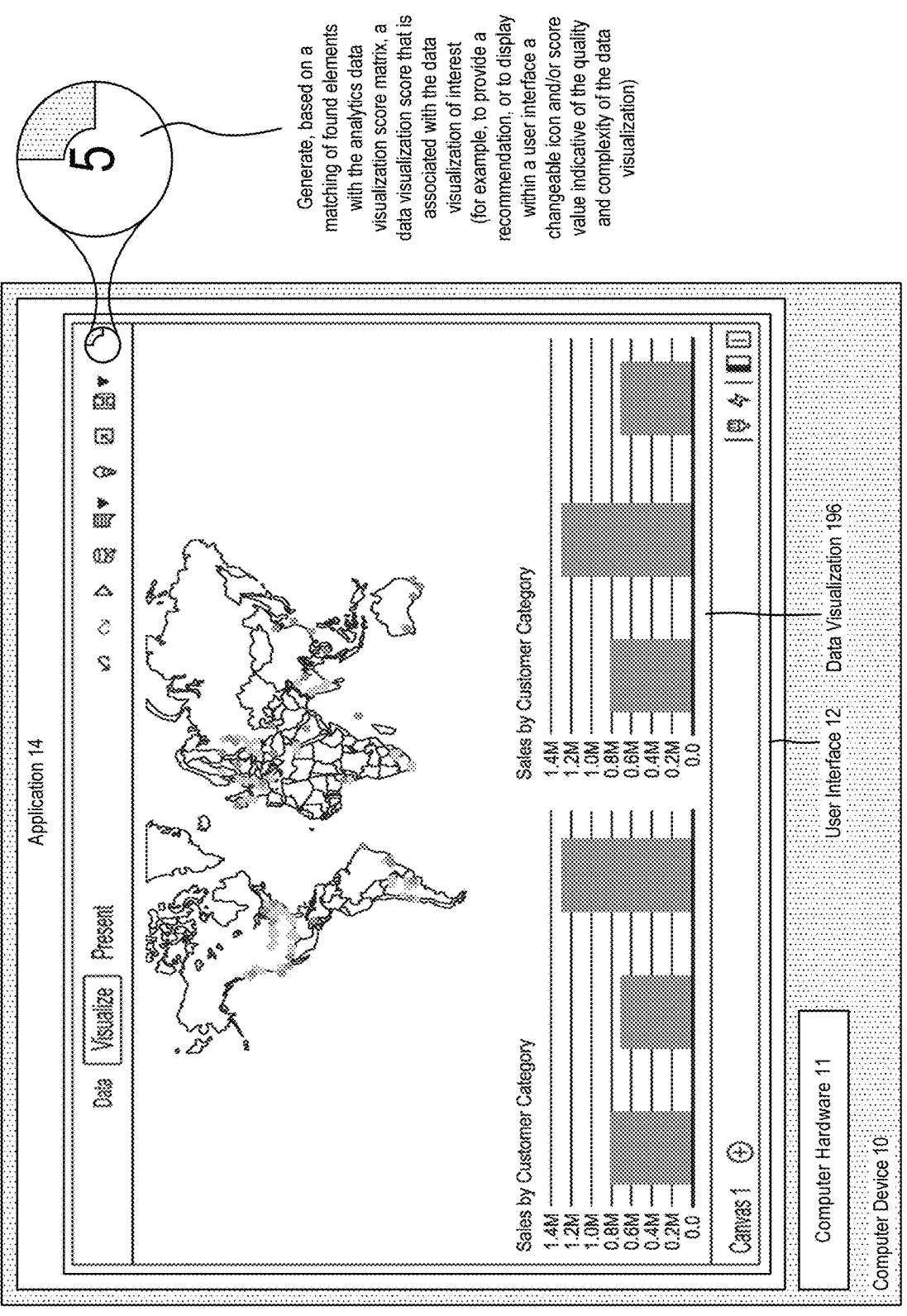

Generate, based on a matching of found elements with the analytics data visualization score matrix, a data visualization score that is associated with the data visualization of interest (for example, to provide a recommendation, or to display within a user interface a changeable icon and/or score value indicative of the quality and complexity of the data visualization)

*FIGURE 12*

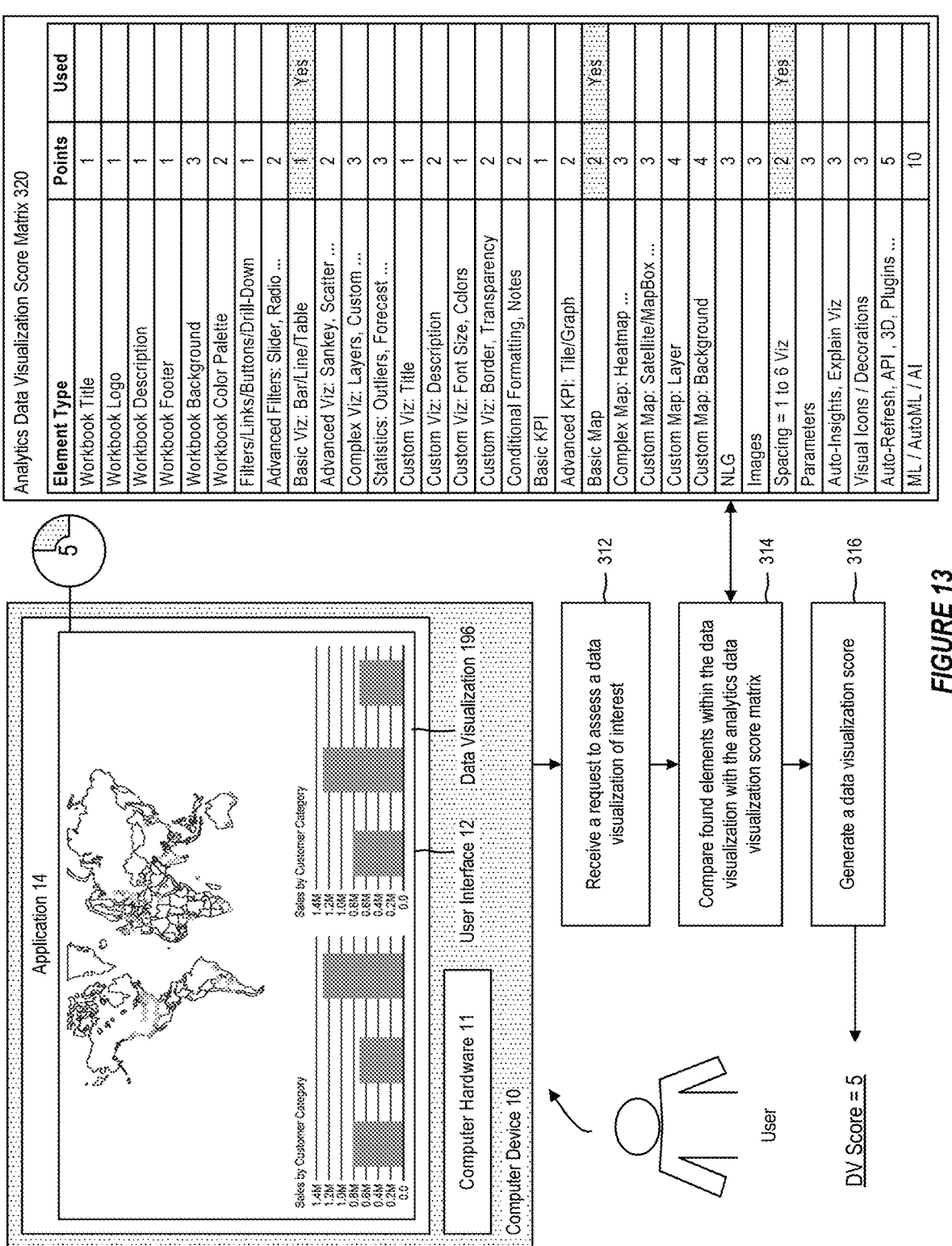

Analytics Data Visualization Score Matrix 320

| Element Type | Points | Used |
|---|---|---|
| Workbook Title | 1 | |
| Workbook Logo | 1 | |
| Workbook Description | 1 | |
| Workbook Footer | 1 | |
| Workbook Background | 3 | |
| Workbook Color Palette | 2 | |
| Filters/Links/Buttons/Drill-Down | 1 | |
| Advanced Filters: Slider, Radio ... | 2 | |
| Basic Viz: Bar/Line/Table | 1 | Yes |
| Advanced Viz: Sankey, Scatter ... | 2 | |
| Complex Viz: Layers, Custom ... | 3 | |
| Statistics: Outliers, Forecast ... | 3 | |
| Custom Viz: Title | 1 | |
| Custom Viz: Description | 2 | |
| Custom Viz: Font Size, Colors | 1 | |
| Custom Viz: Border, Transparency | 2 | |
| Conditional Formatting, Notes | 2 | |
| Basic KPI | 1 | |
| Advanced KPI: Tile/Graph | 2 | |
| Basic Map | 2 | Yes |
| Complex Map: Heatmap ... | 3 | |
| Custom Map: Satellite/MapBox ... | 3 | |
| Custom Map: Layer | 4 | |
| Custom Map: Background | 4 | |
| NLG | 3 | |
| Images | 3 | |
| Spacing = 1 to 6 Viz | 2 | Yes |
| Parameters | 3 | |
| Auto-Insights, Explain Viz | 3 | |
| Visual Icons / Decorations | 3 | |
| Auto-Refresh, API, 3D, Plugins ... | 5 | |
| ML / AutoML / AI | 10 | |

Application 14

Sales by Customer Category

Sales by Customer Category

User Interface 12    Data Visualization 196

Computer Hardware 11

Computer Device 10

312 — Receive a request to assess a data visualization of interest

314 — Compare found elements within the data visualization with the analytics data visualization score matrix 316 — Generate a data visualization score User DV Score = 5

*FIGURE 13*

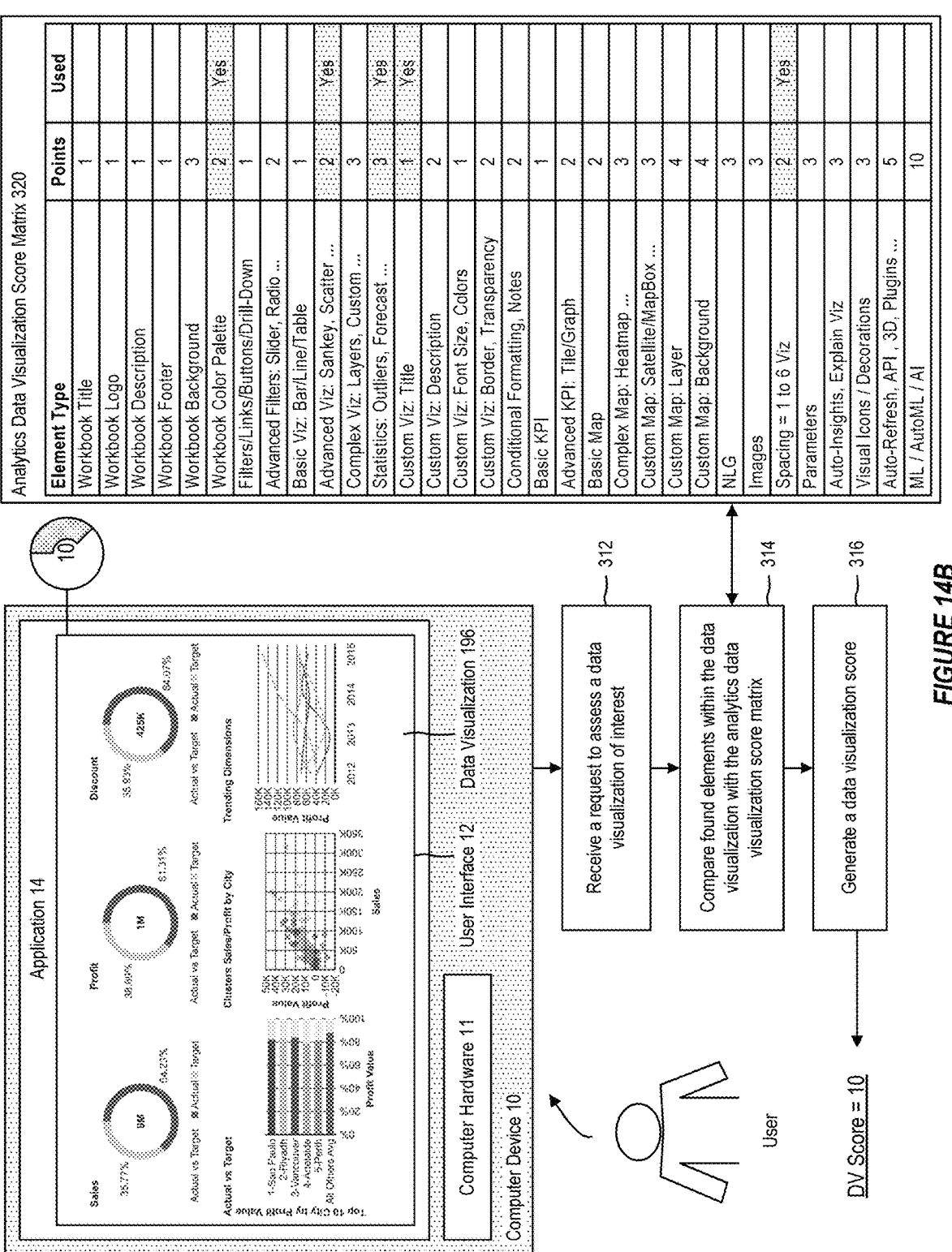

| Analytics Data Visualization Score Matrix 320 | | |
| --- | --- | --- |
| Element Type | Points | Used |
| Workbook Title | 1 | |
| Workbook Logo | 1 | |
| Workbook Description | 1 | |
| Workbook Footer | 1 | |
| Workbook Background | 3 | |
| Workbook Color Palette | 2 | Yes |
| Filters/Links/Buttons/Drill-Down | 1 | |
| Advanced Filters: Slider, Radio ... | 2 | |
| Basic Viz: Bar/Line/Table | 1 | |
| Advanced Viz: Sankey, Scatter ... | 2 | Yes |
| Complex Viz: Layers, Custom ... | 3 | |
| Statistics: Outliers, Forecast ... | 3 | Yes |
| Custom Viz: Title | 1 | Yes |
| Custom Viz: Description | 2 | |
| Custom Viz: Font Size, Colors | 1 | |
| Custom Viz: Border, Transparency | 2 | |
| Conditional Formatting, Notes | 2 | |
| Basic KPI | 1 | |
| Advanced KPI: Tile/Graph | 2 | |
| Basic Map | 2 | |
| Complex Map: Heatmap ... | 3 | |
| Custom Map: Satellite/MapBox ... | 3 | |
| Custom Map: Layer | 4 | |
| Custom Map: Background | 4 | |
| NLG | 3 | |
| Images | 3 | |
| Spacing = 1 to 6 Viz | 2 | Yes |
| Parameters | 3 | |
| Auto-Insights, Explain Viz | 3 | |
| Visual Icons / Decorations | 3 | |
| Auto-Refresh, API , 3D, Plugins ... | 5 | |
| ML / AutoML / AI | 10 | |

Application 14

Data Visualization 196

User Interface 12

Computer Hardware 11

Computer Device 10

312 — Receive a request to assess a data visualization of interest

314 — Compare found elements within the data visualization with the analytics data visualization score matrix 316 — Generate a data visualization score User DV Score = 10

*FIGURE 14B*

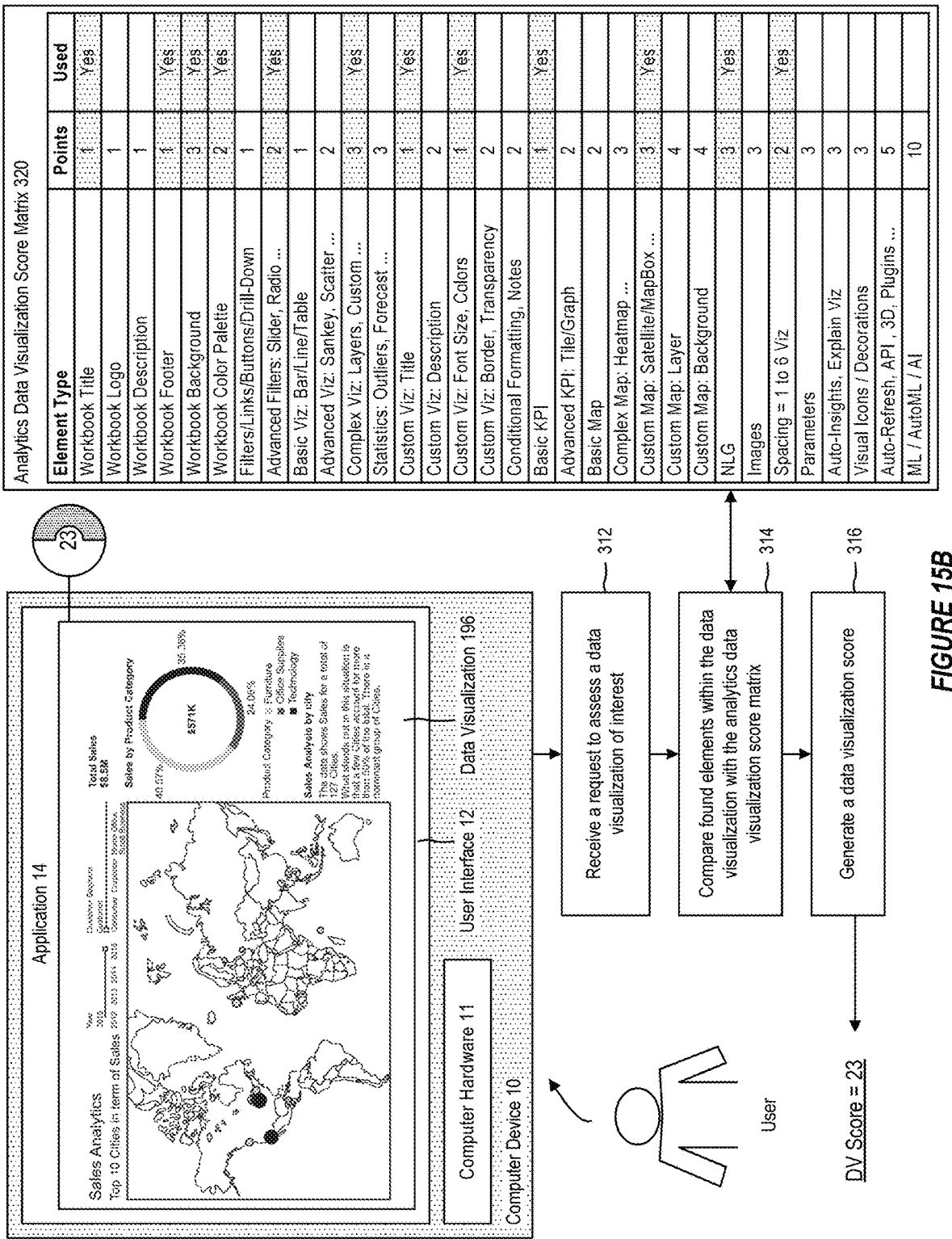

| Analytics Data Visualization Score Matrix 320 | | |
| --- | --- | --- |
| Element Type | Points | Used |
| Workbook Title | 1 | Yes |
| Workbook Logo | 1 | |
| Workbook Description | 1 | |
| Workbook Footer | 1 | Yes |
| Workbook Background | 3 | Yes |
| Workbook Color Palette | 2 | Yes |
| Filters/Links/Buttons/Drill-Down | 1 | |
| Advanced Filters: Slider, Radio ... | 2 | Yes |
| Basic Viz: Bar/Line/Table | 1 | |
| Advanced Viz: Sankey, Scatter ... | 2 | |
| Complex Viz: Layers, Custom ... | 3 | Yes |
| Statistics: Outliers, Forecast ... | 3 | |
| Custom Viz: Title | 1 | Yes |
| Custom Viz: Description | 2 | |
| Custom Viz: Font Size, Colors | 1 | Yes |
| Custom Viz: Border, Transparency | 2 | |
| Conditional Formatting, Notes | 2 | |
| Basic KPI | 1 | Yes |
| Advanced KPI: Tile/Graph | 2 | |
| Basic Map | 2 | |
| Complex Map: Heatmap ... | 3 | |
| Custom Map: Satellite/MapBox ... | 3 | Yes |
| Custom Map: Layer | 4 | |
| Custom Map: Background | 4 | |
| NLG | 3 | Yes |
| Images | 3 | |
| Spacing = 1 to 6 Viz | 2 | Yes |
| Parameters | 3 | |
| Auto-Insights, Explain Viz | 3 | |
| Visual Icons / Decorations | 3 | |
| Auto-Refresh, API , 3D, Plugins ... | 5 | |
| ML / AutoML / AI | 10 | |

312 — Receive a request to assess a data visualization of interest

314 — Compare found elements within the data visualization with the analytics data visualization score matrix 316 — Generate a data visualization score DV Score = 23

User

*FIGURE 15B*

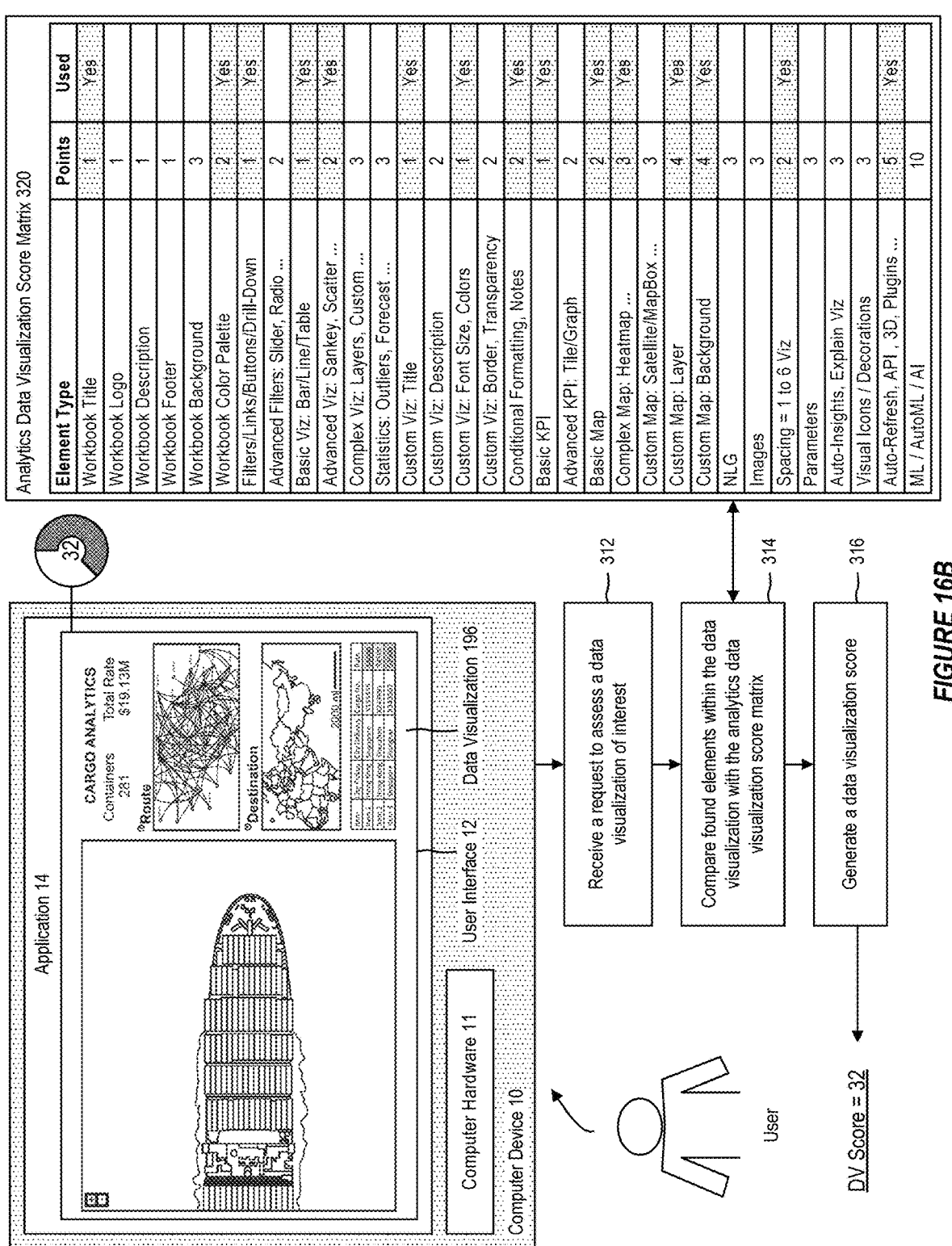

| Analytics Data Visualization Score Matrix 320 | | |
| --- | --- | --- |
| Element Type | Points | Used |
| Workbook Title | 1 | Yes |
| Workbook Logo | 1 | |
| Workbook Description | 1 | |
| Workbook Footer | 1 | |
| Workbook Background | 3 | |
| Workbook Color Palette | 2 | Yes |
| Filters/Links/Buttons/Drill-Down | 1 | Yes |
| Advanced Filters: Slider, Radio ... | 2 | |
| Basic Viz: Bar/Line/Table | 1 | Yes |
| Advanced Viz: Sankey, Scatter ... | 2 | Yes |
| Complex Viz: Layers, Custom ... | 3 | |
| Statistics: Outliers, Forecast ... | 3 | |
| Custom Viz: Title | 1 | Yes |
| Custom Viz: Description | 2 | |
| Custom Viz: Font Size, Colors | 1 | Yes |
| Custom Viz: Border, Transparency | 2 | |
| Conditional Formatting, Notes | 2 | Yes |
| Basic KPI | 1 | Yes |
| Advanced KPI: Tile/Graph | 2 | |
| Basic Map | 2 | Yes |
| Complex Map: Heatmap ... | 3 | Yes |
| Custom Map: Satellite/MapBox ... | 3 | |
| Custom Map: Layer | 4 | Yes |
| Custom Map: Background | 4 | Yes |
| NLG | 3 | |
| Images | 3 | |
| Spacing = 1 to 6 Viz | 2 | Yes |
| Parameters | 3 | |
| Auto-Insights, Explain Viz | 3 | |
| Visual Icons / Decorations | 3 | |
| Auto-Refresh, API , 3D, Plugins ... | 5 | Yes |
| ML / AutoML / AI | 10 | |

312 — Receive a request to assess a data visualization of interest

314 — Compare found elements within the data visualization with the analytics data visualization score matrix 316 — Generate a data visualization score DV Score = 32

User

FIGURE 16B

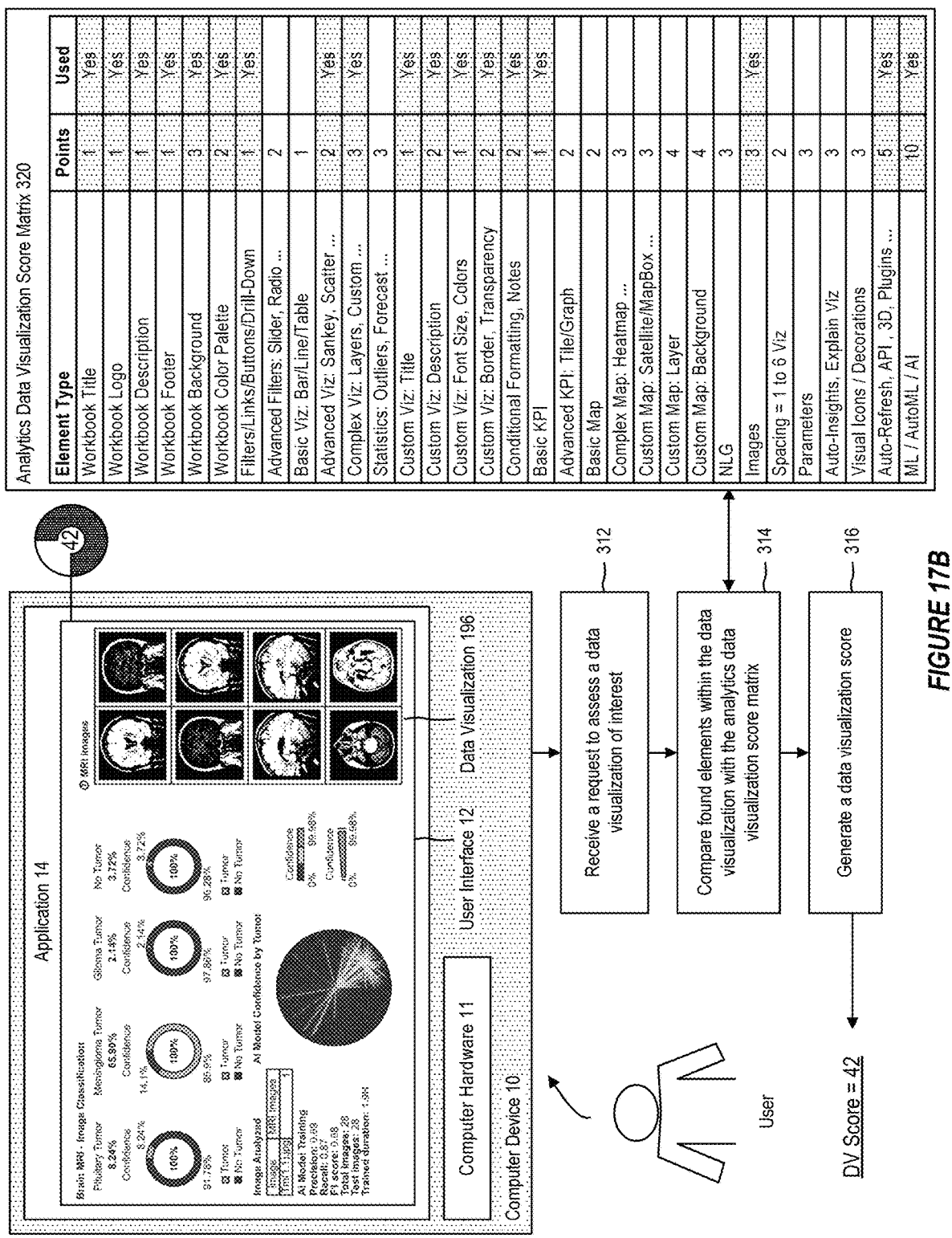

Analytics Data Visualization Score Matrix 320

| Element Type | Points | Used |
|---|---|---|
| Workbook Title | 1 | Yes |
| Workbook Logo | 1 | Yes |
| Workbook Description | 1 | Yes |
| Workbook Footer | 1 | Yes |
| Workbook Background | 3 | Yes |
| Workbook Color Palette | 2 | Yes |
| Filters/Links/Buttons/Drill-Down | 1 | Yes |
| Advanced Filters: Slider, Radio ... | 2 | |
| Basic Viz: Bar/Line/Table | 1 | |
| Advanced Viz: Sankey, Scatter ... | 2 | Yes |
| Complex Viz: Layers, Custom ... | 3 | Yes |
| Statistics: Outliers, Forecast ... | 3 | |
| Custom Viz: Title | 1 | Yes |
| Custom Viz: Description | 2 | Yes |
| Custom Viz: Font Size, Colors | 1 | Yes |
| Custom Viz: Border, Transparency | 2 | Yes |
| Conditional Formatting, Notes | 2 | Yes |
| Basic KPI | 1 | Yes |
| Advanced KPI: Tile/Graph | 2 | |
| Basic Map | 2 | |
| Complex Map: Heatmap ... | 3 | |
| Custom Map: Satellite/MapBox ... | 3 | |
| Custom Map: Layer | 4 | |
| Custom Map: Background | 4 | |
| NLG | 3 | |
| Images | 3 | Yes |
| Spacing = 1 to 6 Viz | 2 | |
| Parameters | 3 | |
| Auto-Insights, Explain Viz | 3 | |
| Visual Icons / Decorations | 3 | |
| Auto-Refresh, API, 3D, Plugins ... | 5 | Yes |
| ML / AutoML / AI | 10 | Yes |

42

Application 14

Brain MRI - Image Classification

Pituitary Tumor
8.24%
Confidence

Meningioma Tumor
65.90%
Confidence

Glioma Tumor
2.14%
Confidence

No Tumor
3.72%
Confidence

100%
91.76%
☑ Tumor  ☐ No Tumor

100%
34.1%
☑ Tumor  ☐ No Tumor

100%
97.86%
☑ Tumor  ☐ No Tumor

100%
96.28%
☑ Tumor  ☐ No Tumor

AI Model Confidence

Image Analyzed
| Image | MRI Images |
| MRI Images | 1 |

AI Model Training
Precision: 0.98
Recall: 0.97
F1 score: 0.98
Total Images: 28
Test Images: 28
Trained duration: 1.9H AI Model Confidence by Tumor Confidence
0%  99.98%

Confidence
0%  99.98%

☑ Tumor  ☐ No Tumor

☐ MRI Images

User Interface 12 Data Visualization 196

Computer Hardware 11

Computer Device 10

User

312 Receive a request to assess a data visualization of interest

314 Compare found elements within the data visualization with the analytics data visualization score matrix

316 Generate a data visualization score

DV Score = 42

*FIGURE 17B*

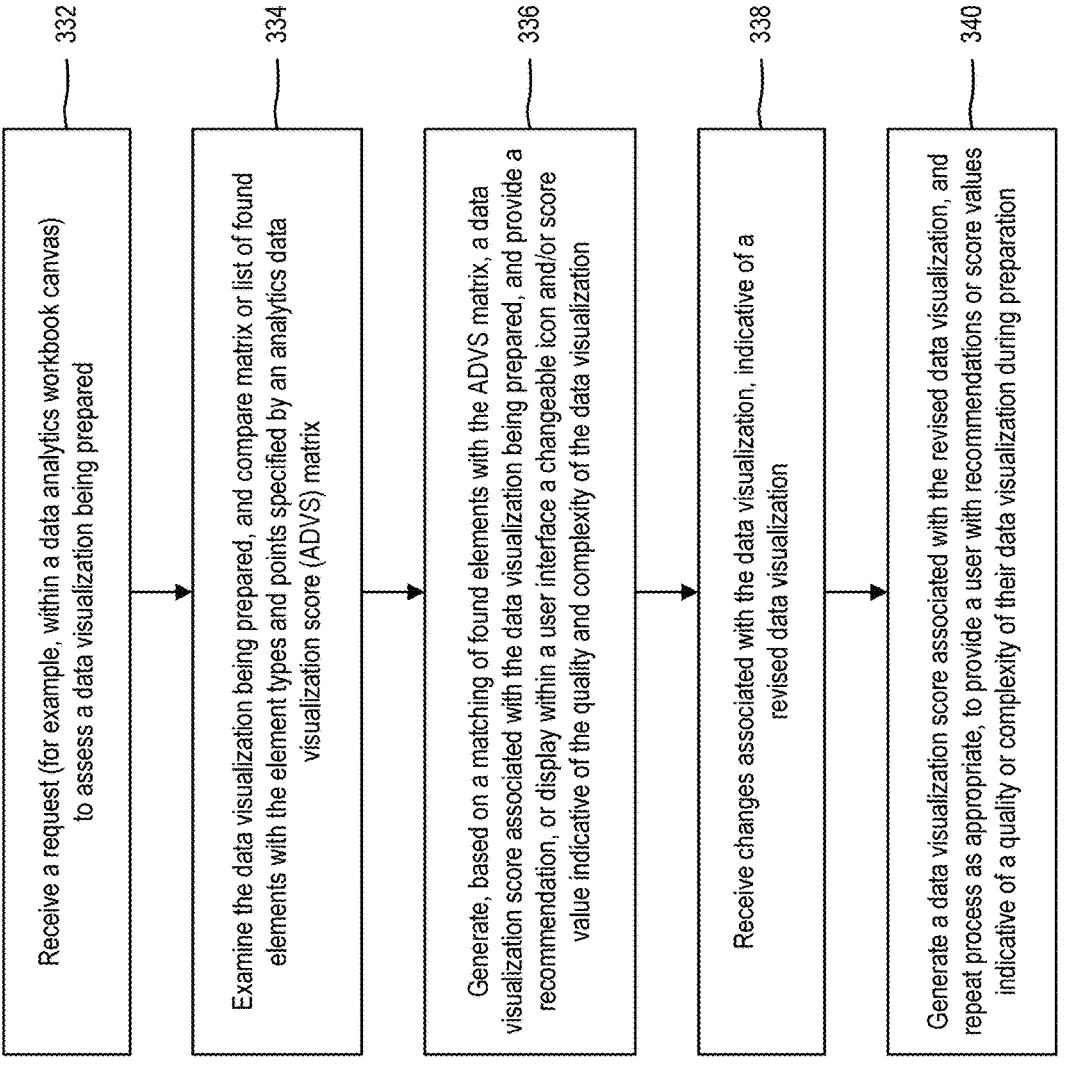

332

Receive a request (for example, within a data analytics workbook canvas) to assess a data visualization being prepared

334

Examine the data visualization being prepared, and compare matrix or list of found elements with the element types and points specified by an analytics data visualization score (ADVS) matrix

336

Generate, based on a matching of found elements with the ADVS matrix, a data visualization score associated with the data visualization being prepared, and provide a recommendation, or display within a user interface a changeable icon and/or score value indicative of the quality and complexity of the data visualization

338

Receive changes associated with the data visualization, indicative of a revised data visualization

340

Generate a data visualization score associated with the revised data visualization, and repeat process as appropriate, to provide a user with recommendations or score values indicative of a quality or complexity of their data visualization during preparation

*FIGURE 19*

SYSTEM AND METHOD FOR GENERATING DATA VISUALIZATION SCORES FOR USE WITH A DATA ANALYTICS ENVIRONMENT

CLAIM OF PRIORITY AND CROSS-REFERENCE TO RELATED APPLICATIONS

This application claims the benefit of priority to U.S. Provisional patent application titled "SYSTEM AND METHOD FOR GENERATING DATA VISUALIZATION SCORES FOR USE WITH A DATA ANALYTICS ENVIRONMENT", Application No. 63/615,732, filed Dec. 28, 2023; which application and the contents thereof are herein incorporated by reference.

COPYRIGHT NOTICE

TECHNICAL FIELD

Embodiments described herein are generally related to systems and methods for providing data analytics, and are particularly related to a system and method for generating data visualization scores, for use with data analytics environments.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

A data analytics environment may allow users to create data visualizations which reflect a particular set of data or understanding. When creating such data visualizations, users may seek assistance as to whether their data visualization is appropriately designed to illustrate the data, or if the data visualization could perhaps be enhanced or improved in some way.

However, although an organization may provide a set of design principles by which a data visualization might be prepared for use within that organization, the assessment of such data visualizations may be somewhat subjective, or based on a user's personal preferences.

SUMMARY

Embodiments described herein are generally related to systems and methods for generating data visualization scores, for use with data analytics environments. In accordance with an embodiment, the system can operate in the manner of an expert system, or according to a series of processes or rules, to examine a data visualization of interest, compare a list of found elements with element types specified by an analytics data visualization score matrix, and generate, based on matching found elements with the analytics data visualization matrix, a data visualization score associated with the data visualization.

In accordance with an embodiment, the system can operate as a data visualization advisor, during preparation of a data visualization, to provide a user with recommendations or score values indicative of a quality or complexity of their data visualization, which may be helpful in improving their data visualization, for example from a beginner-level to a more advanced-level.

BRIEF DESCRIPTION OF THE DRAWINGS

FIG. 10 illustrates a method for generating data visualization scores, for use with data analytics environments, in accordance with an embodiment.

FIG. 12 further illustrates how the system can be used to generate data visualization scores, in accordance with an embodiment.

FIG. 13 illustrates an example use of generating data visualization scores, in accordance with an embodiment.

FIG. 14B illustrates another example use of generating data visualization scores, in accordance with an embodiment.

FIG. 15B illustrates another example use of generating data visualization scores, in accordance with an embodiment.

FIG. 16B illustrates another example use of generating data visualization scores, in accordance with an embodiment.

FIG. 17B illustrates another example use of generating data visualization scores, in accordance with an embodiment.

FIG. 19 illustrates a method for using data visualization scores, for use with data analytics environments, in accordance with an embodiment.

DETAILED DESCRIPTION

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.
Data Analytics Environments FIG. 1 illustrates an example data analytics environment, in accordance with an embodiment.

Figure 1:
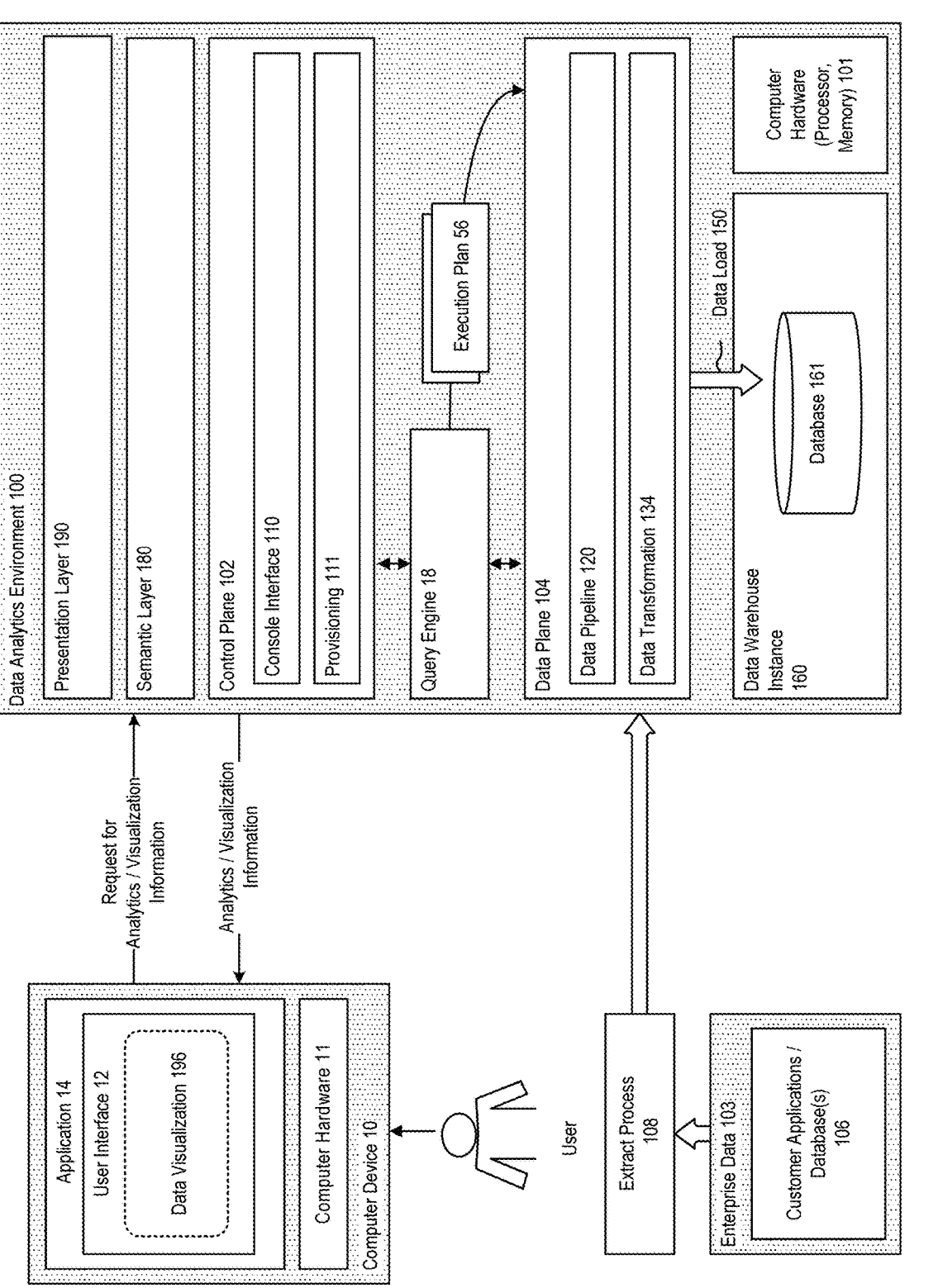
FIG. 1 illustrates an example data analytics system or environment, in accordance with an embodiment.

The embodiment illustrated in FIG. 1 is provided for illustrating an example data analytics environment in association with which various embodiments described herein can be used. The components and processes illustrated in FIG. 1 and as described elsewhere herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access in the manner of a data layer 270 to a data warehouse instance 160 (e.g., having a database 161, or other type of data source).

In accordance with an embodiment, the control plane operates to provide control for cloud or other software products offered within the context of a cloud environment. For example, in accordance with an embodiment, the control plane can include a console interface 110 that enables access by a tenant and/or a cloud environment having a provisioning component 111, for example to allow tenants to provision services for use within their enterprise environment. The provisioning component can provision a data warehouse instance, including a customer schema of the data warehouse; and populate the data warehouse instance with the appropriate information supplied by the tenant/customer.

In accordance with an embodiment, the data plane can include a data pipeline or process layer 120 and a data transformation layer 134, that together process data from an organization's enterprise software environment, and load a transformed data into the data warehouse. The data transformation layer can include a data model, such as, for example, a knowledge model (KM), or other type of data model, that the system uses to transform the data received from business applications and corresponding databases, into a model format understood by the data analytics environment. The data plane is responsible for performing extract, transform, and load (ETL) operations, including extracting data from an organization's enterprise software environment, transforming the extracted data into a model format, and loading the transformed data into a customer schema of the data warehouse.

For example, in accordance with an embodiment, each tenant of the environment can be associated with their own customer schema; and can be additionally provided with read-only access to the data analytics schema, which can be updated by a data pipeline or process, for example, an ETL process, on a periodic or other basis. For example, a data pipeline or process can be scheduled to execute at intervals (e.g., hourly/daily/weekly) to extract data from an enterprise software environment, such as, for example, business productivity software applications and corresponding databases 106.

In accordance with an embodiment, an extract process 108 can extract the data, whereupon extraction the data pipeline or process can insert extracted data into a data staging area, which can act as a temporary staging area for the extracted data. When the extract process has completed its extraction, the data transformation layer can be used to transform the extracted data into a model format to be loaded into the customer schema of the data warehouse. During the data transformation, the system can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into the customer schema, the transformed data can be analyzed and used in a variety of additional business intelligence processes.

Different tenants may have different requirements with regard to how their data is classified, aggregated, or transformed, for providing data analytics or business intelligence data, or developing software analytic applications. In accordance with an embodiment, to support such different requirements, a semantic layer 180 can include data defining a semantic model of a tenant's data; which is useful in assisting users in understanding and accessing that data using commonly-understood business terms; and provide custom content to a presentation layer 190.

In accordance with an embodiment, a tenant may perform modifications to their data source model, to support their particular requirements, for example by adding custom facts or dimensions associated with the data stored in their data warehouse instance; and the system can extend the semantic model accordingly. A semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, the presentation layer can enable access to the data content using, for example, a software analytic application, user interface, analytics dashboard, key performance indicators (KPI's); or other type of report or interface as may be provided by products such as, for example, Oracle Analytics Cloud, or Oracle Analytics for Applications.

In accordance with an embodiment, a query engine 18 (e.g., an Oracle Business Intelligence Server, OBIS instance) operates in the manner of a federated query engine to serve analytical queries or requests from clients directed to data stored at a database. The query engine can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query.

In accordance with an embodiment, a user/developer can interact with a client computer device 10 that includes a computer hardware 11 (e.g., processor, storage, memory), user interface 12, and client application 14. A query engine or business intelligence server generally operates to process inbound, e.g., SQL, requests against a database model, build and execute one or more physical database queries, process the data appropriately, and return the data in response to the request.

To accomplish this, in accordance with an embodiment, the query engine can include a logical or business model, or metadata, that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, the query engine may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine can process queries against a database according to a query execution plan. During operation the query engine can create a query execution plan which can then be further optimized, for example to perform aggregations of data necessary to respond to a request. Data can be combined together and further calculations applied, before the results are returned to the calling application.

In accordance with an embodiment, a request for data analytics or visualization information can be received via a client application and user interface as described above, and communicated to the data analytics environment (in the example of a cloud environment, via a cloud service). The system can retrieve an appropriate dataset to address the user/business context, for use in generating and returning the requested data analytics or visualization information to the client, as a data visualization 196.

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the data analytics environment, or in the example of a cloud environment via a cloud service provided by the environment.

Figure 2:
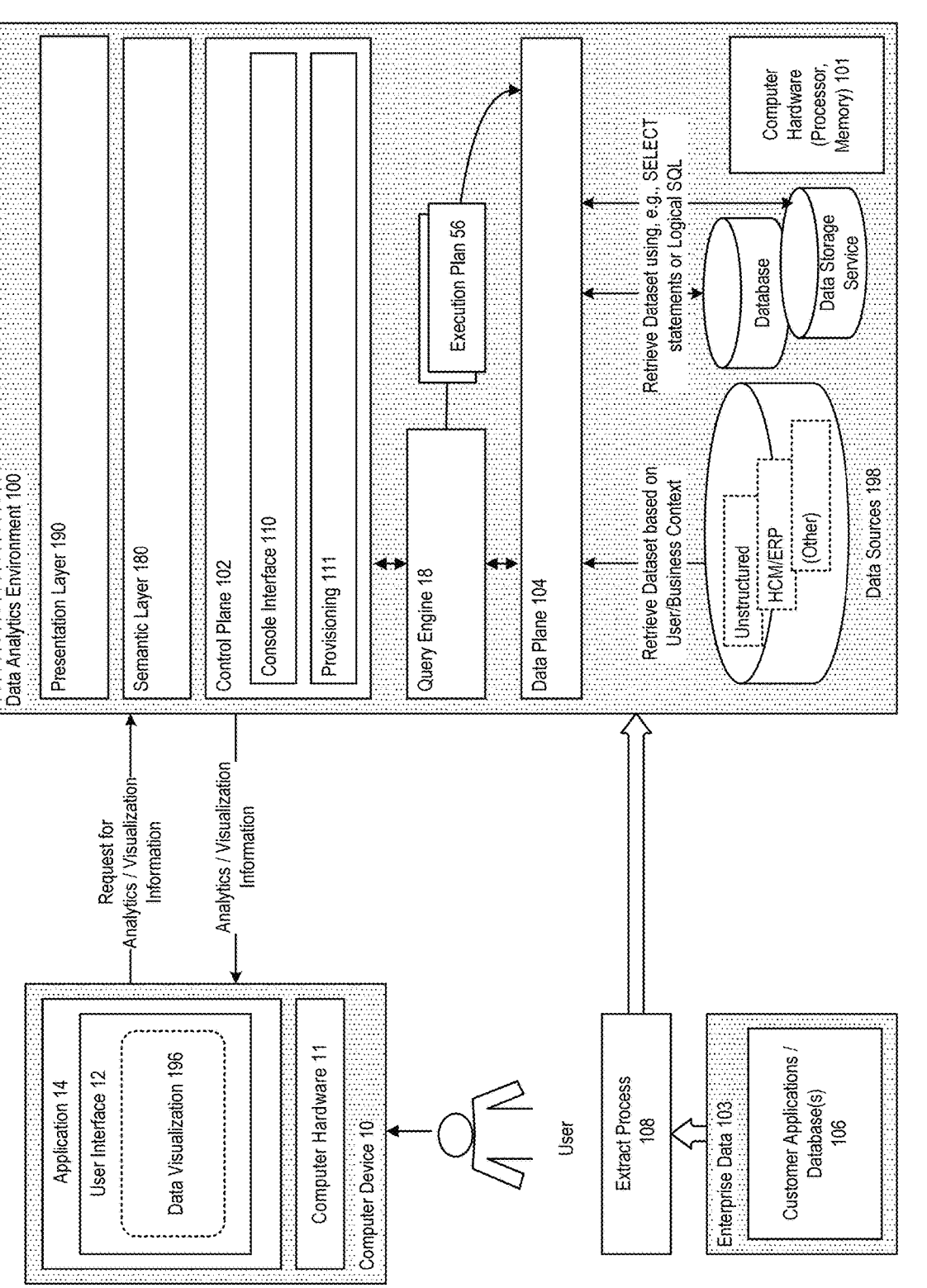
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the data analytics environment enables a dataset to be retrieved, received, or prepared from one or more data source(s) 198, for example via one or more data source connections. Examples of the types of data that can be transformed, analyzed, or visualized using the systems and methods described herein include data directed to Enterprise Resource Planning (ERP), Human Capital Management (HCM), or Human Resources (HR), or other types of data provided at one or more of a database, data storage service, or other type of data repository or data source.

For example, in accordance with an embodiment, a request for data analytics or visualization information can be received via a client application and user interface as described above, and communicated to the data analytics environment, for example via a cloud service. The system can retrieve an appropriate dataset to address the user/business context, for use in generating and returning the requested data analytics or visualization information to the client.

Figure 3:
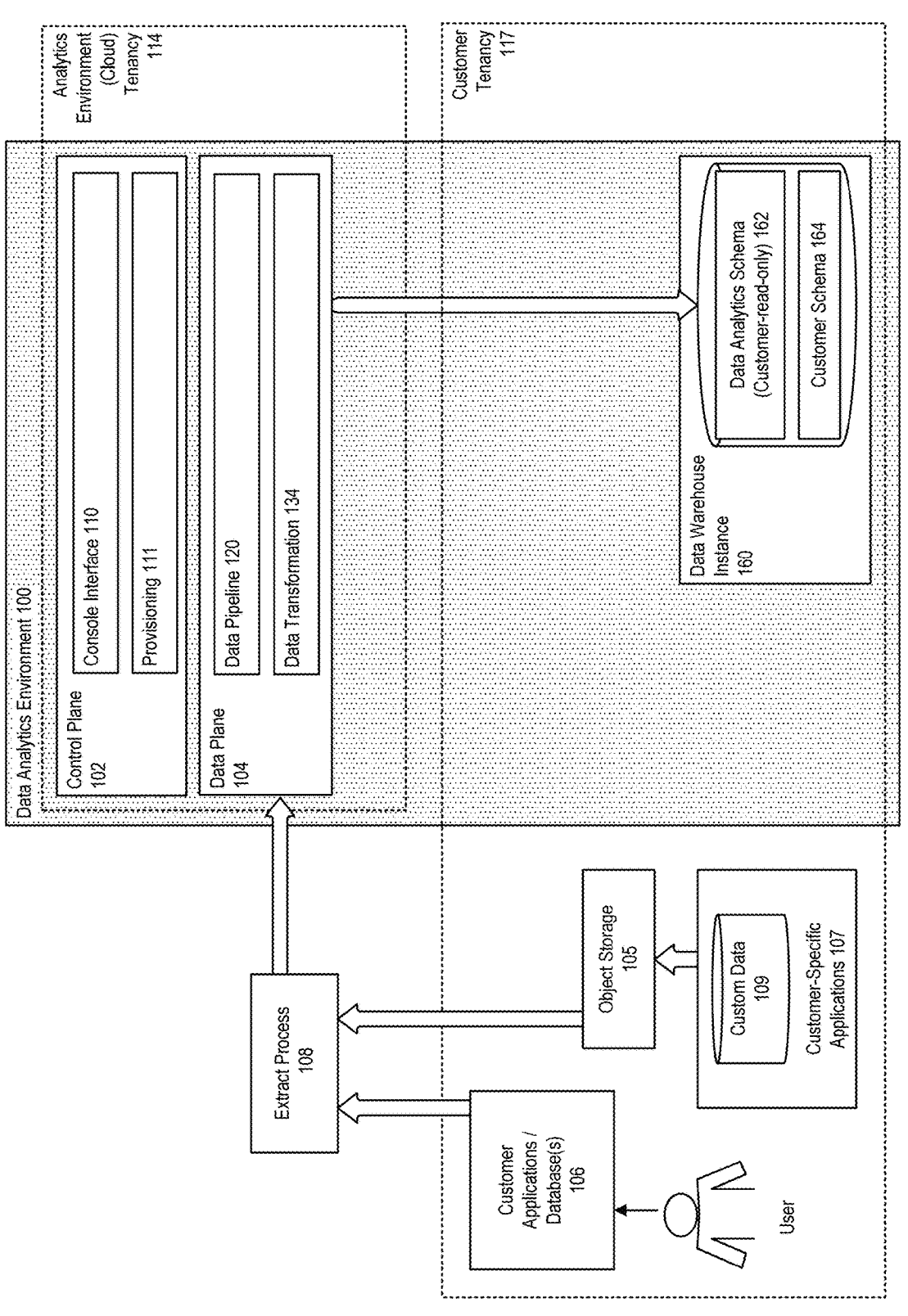
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a tenant's enterprise software environment (106), using the data pipeline process; or as custom data 109 sourced from one or more tenant or customer-specific applications 107; and loaded to a data warehouse instance, including in some examples the use of an object storage 105 for storage of the data. A user can create a dataset that uses tables from different connections and schemas. The system uses the relationships defined between these tables to create relationships or joins in the dataset.

In accordance with an embodiment, the data warehouse can include a default data analytics schema 162 and, for each tenant of the system, a customer schema 164. For each tenant, the system uses the data analytics schema that is maintained and updated by the system, within a system/cloud tenancy 114, to pre-populate a data warehouse instance for the tenant, based on an analysis of the data within that tenant's enterprise applications environment, and within a customer tenancy 117. As such, the data analytics schema maintained by the system enables data to be retrieved, by the data pipeline or process, from the tenant's environment, and loaded to the tenant's data warehouse instance.

In accordance with an embodiment, the system also provides, for each tenant of the environment, a customer schema that allows the tenant to supplement and utilize the data within their own data warehouse instance. For each tenant, their resultant data warehouse instance operates as a database whose contents are partly-controlled by the tenant; and partly-controlled by the environment (system).

For example, in accordance with an embodiment, a data warehouse can include a data analytics schema and, for each tenant, a customer schema sourced from their enterprise software environment. The data provisioned in a data warehouse tenancy is accessible only to that tenant; while at the same time allowing access to various, e.g., ETL-related or other features of the shared environment.

In accordance with an embodiment, for a particular tenant, upon extraction of their data, the data pipeline or process can insert the extracted data into a data staging area for the tenant, which can act as a temporary staging area for the extracted data. When the extract process has completed its extraction, the data transformation layer can be used to transform the extracted data into a model format to be loaded into the customer schema of the data warehouse.

Figure 4:
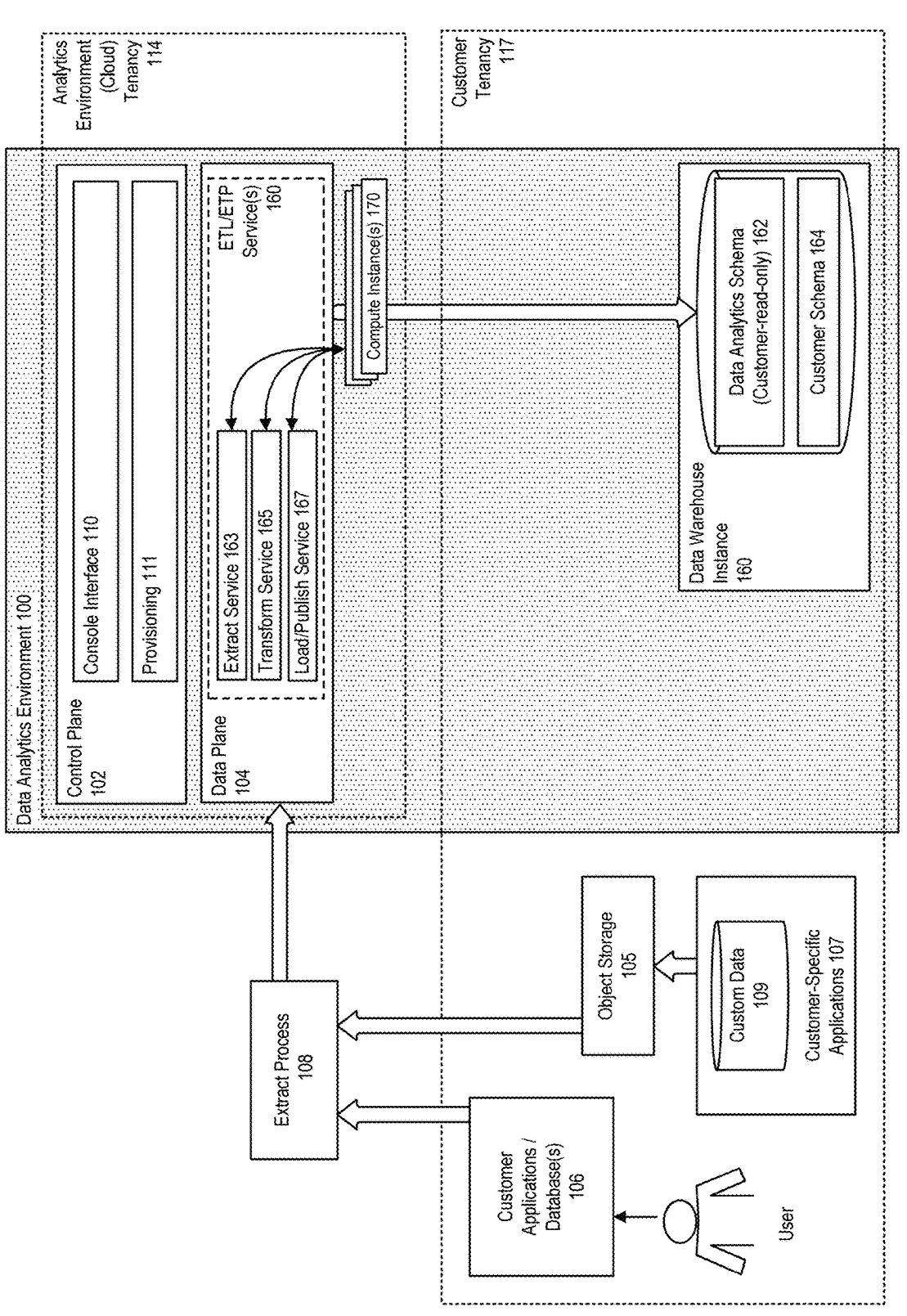
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data from a tenant's enterprise software environment, and loading the data to a data warehouse instance, or refreshing the data in a data warehouse, generally involves several stages, performed by an ETP service 160 or process, including one or more extraction service 163; transformation service 165; and load/publish service 167, executed by one or more compute instance(s) 170.

For example, in accordance with an embodiment, extracted files can be uploaded to an object storage component for storage of the data. The transformation process then applies a business logic while loading them to a target data warehouse, e.g., an Autonomous Data Warehouse (ADW) database, which is internal to the data pipeline or process, and is not exposed to the tenant. A load/publish service or process takes the data from the ADW database and publishes it to a data warehouse instance that is accessible to the tenant.

Figure 5:
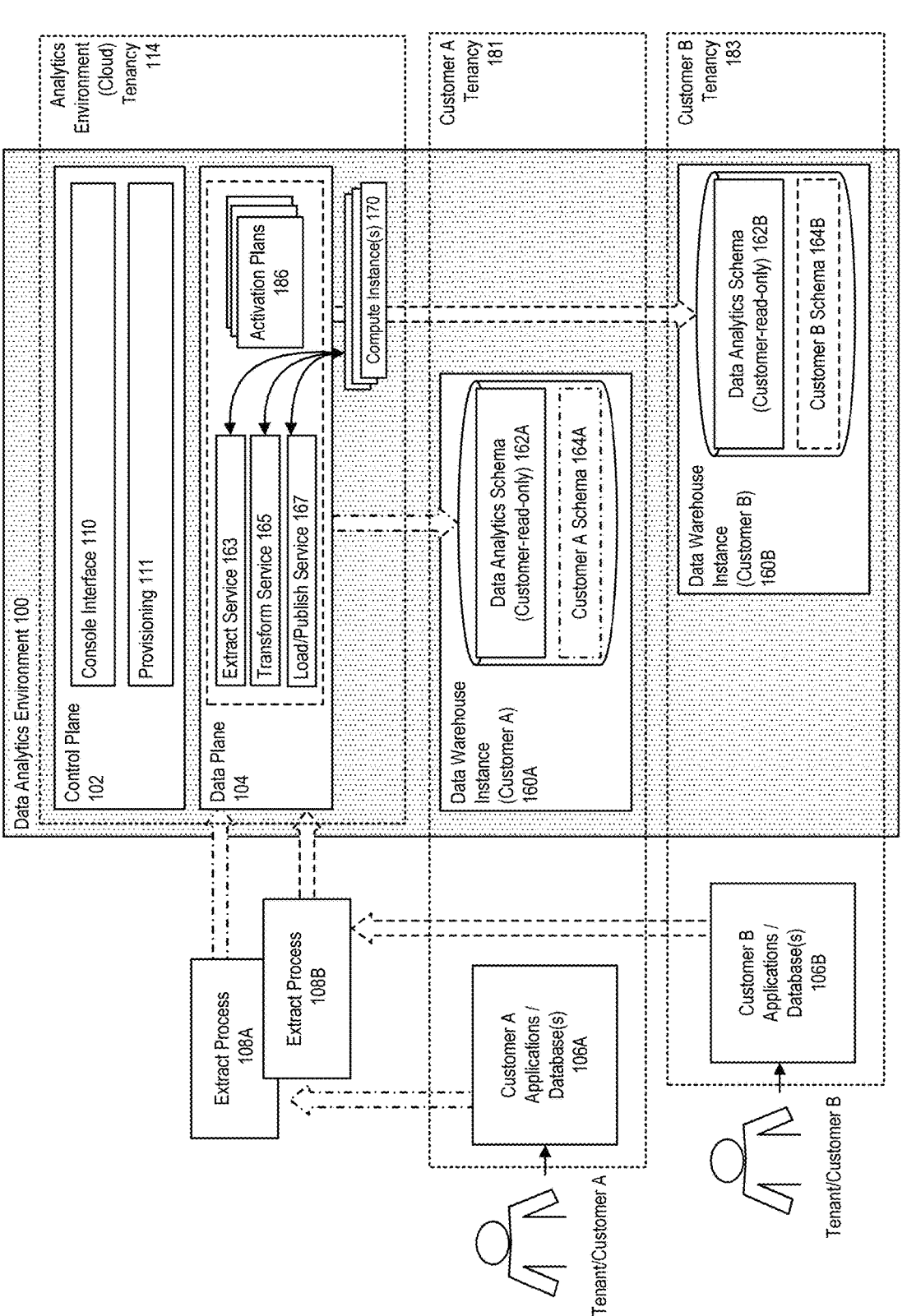
FIG. 5 further illustrates an example data analytics environment, in accordance with an embodiment.

FIG. 5 further illustrates an example data analytics environment, in accordance with an embodiment.

As illustrated in FIG. 5, in accordance with an embodiment, the data pipeline or process maintains, for each of a plurality of tenants, for example Customer A 180, Customer B 182, a data analytics schema that is updated on a periodic basis, by the system in accordance with best practices for a particular analytics use case. For each of a plurality of tenants (e.g., Customers A, B), the system uses the data analytics schema 162A, 162B, that is maintained and updated by the system, to pre-populate a data warehouse instance for the tenant, based on an analysis of the data within that tenant's enterprise applications environment 106A, 106B, and within each customer's tenancy (e.g., Customer A tenancy 181, Customer B tenancy 183); so that data is retrieved, by the data pipeline or process, from the tenant's environment, and loaded to the tenant's data warehouse instance 160A, 160B.

In accordance with an embodiment, the data analytics environment also provides, for each of a plurality of tenants of the environment, a customer schema (e.g., Customer A schema 164A, Customer B schema 164B) that allows the customer to supplement and utilize the data within their own data warehouse instance.

As described above, in accordance with an embodiment, for each of a plurality of tenants of the data analytics environment, their resultant data warehouse instance operates as a database whose contents are partly-controlled by the tenant; and partly-controlled by the data analytics environment (system); including that their database appears pre-populated with appropriate data that has been retrieved from their enterprise applications environment to address analytics use cases. When the extract process 108A, 108B for a particular tenant has completed its extraction, the data transformation layer can be used to transform the extracted data into a model format to be loaded into the customer schema of the data warehouse.

In accordance with an embodiment, activation plans 186 can be used to control the operation of the data pipeline or process services for a tenant, for a particular functional area, to address that tenant's particular needs. For example, an activation plan can define a number of extract, transform, and load (publish) services or steps to be run in a certain order, at a certain time of day, and within a certain window of time.

Figure 6:
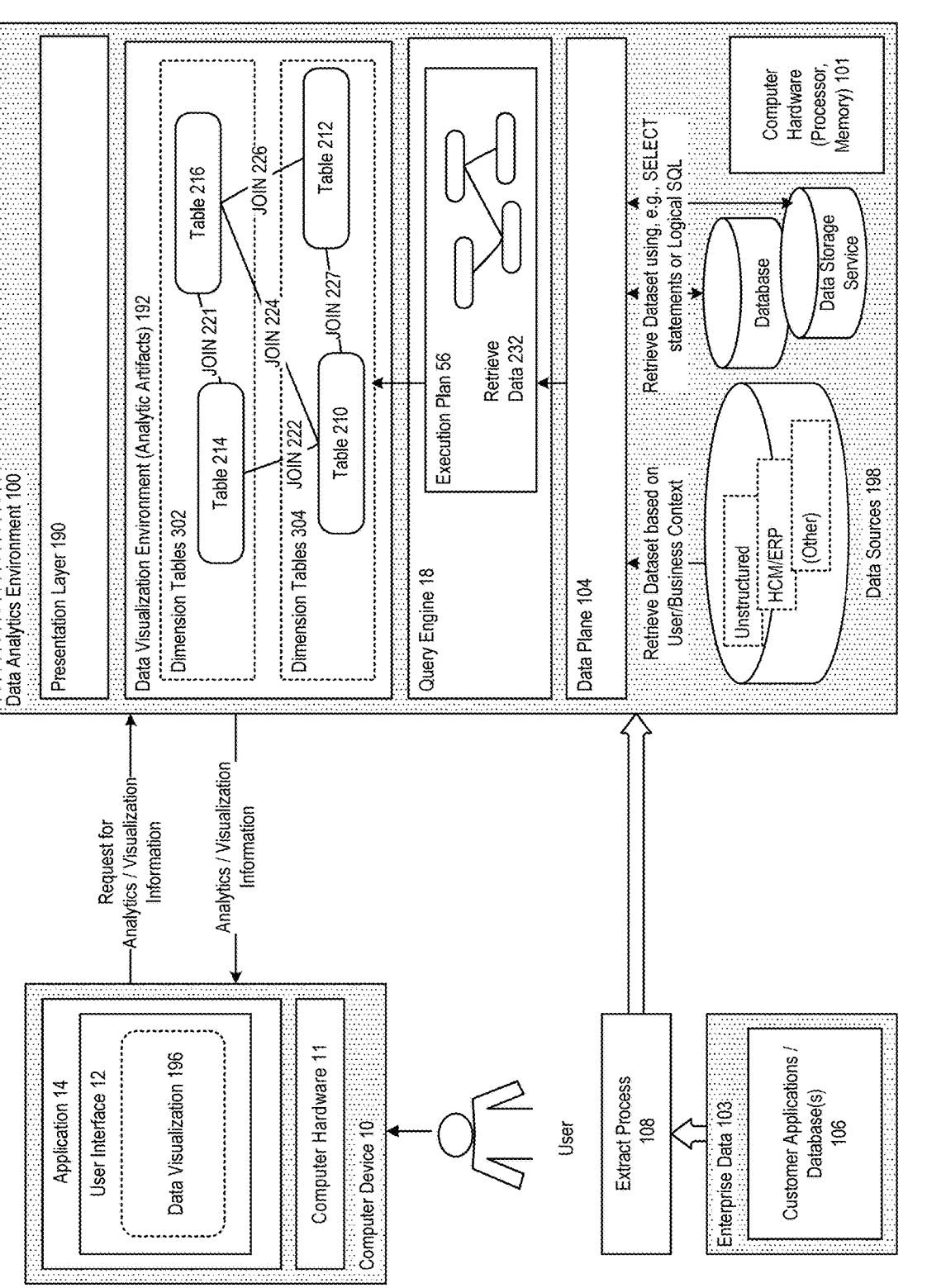
FIG. 6 further illustrates an example data analytics environment, in accordance with an embodiment.

FIG. 6 further illustrates an example data analytics environment, in accordance with an embodiment.

Generally described, within a database or data warehouse, the data of interest may be spread across multiple tables. In such environments, joins can be used to stitch the data from various tables together, to better prepare the data for analysis.

For example, as illustrated in FIG. 6, in accordance with an embodiment, the data analytics environment enables a dataset to be retrieved, received, or prepared from one or more data source(s), for example via one or more data source connections, fact and/or dimension tables 210-216, or joins 221-227 between selections of dimension tables 302, 304.

In accordance with an embodiment, a request received at a data visualization environment to display analytic artifacts 192, for example as may be related to key performance indicators, analytics dashboards, or scorecards, can be received via a client application and user interface as described above, and communicated to the data analytics environment via a cloud service. The system can retrieve 232 an appropriate dataset using, e.g., SELECT statements, to address the user/business context, for use in generating and returning the requested data analytics or visualization information to the client.

Data Visualizations

In accordance with an embodiment, the system provides functionality that allows a user to generate datasets, analyses, or visualizations for display within a user interface, for example to explore datasets or data sourced from multiple data sources.

Figure 7:
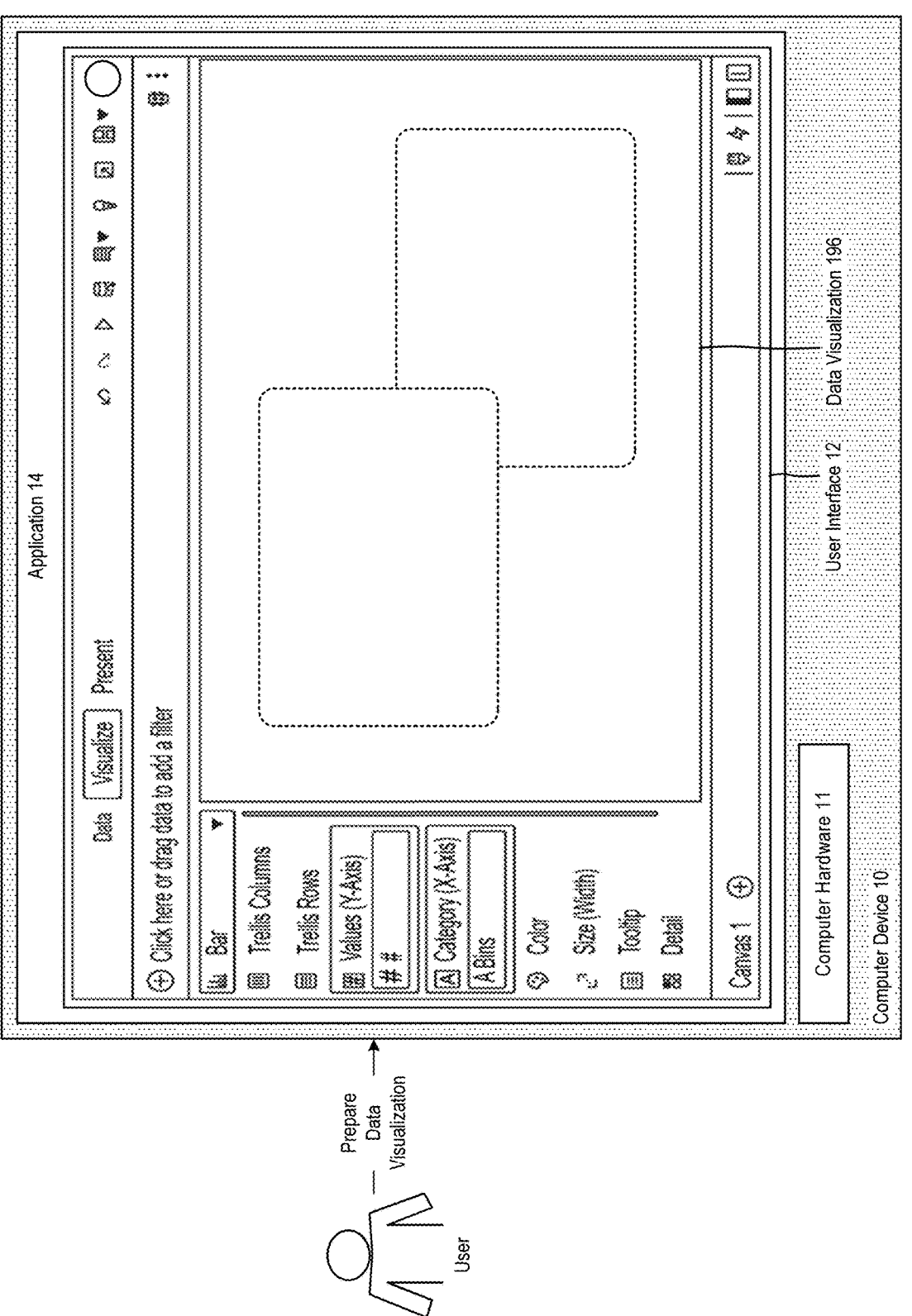
FIG. 7 illustrates the preparation of a data visualization for use with a data analytics environment, in accordance with an embodiment.

FIG. 7 illustrates the preparation of a data visualization for use with a data analytics environment, in accordance with an embodiment.

As illustrated in FIG. 7, in accordance with an embodiment, the system allows a user to prepare a data visualization for use with a dataset. For example, a panel of visualization options allows users to add data visualization elements to a workbook or canvas, to create a dashboard or data visualization.

For example, in accordance with an embodiment, the user can create a workbook, add a dataset, and then drag and drop its columns onto a canvas to create visualizations.

In accordance with an embodiment, the user can choose between various types of connections to create datasets based on data from tables in, e.g., a database connection, an Oracle subject area, an Oracle ADW connection, or a spreadsheet, file, or other type of data source.

In accordance with an embodiment, the system can automatically generate a visualization based on the contents of the canvas, with one or more visualization types automatically selected for selection by the user. For example, if the user adds a revenue measure to the canvas, the data element may be placed in a values area of a grammar panel, and a Tile visualization type selected.

In accordance with an embodiment, the system can provide automatically generated data visualizations (automatically-generated insights, auto-insights), by suggesting visualizations which are expected to provide the best insights for a particular dataset.

Figure 8:
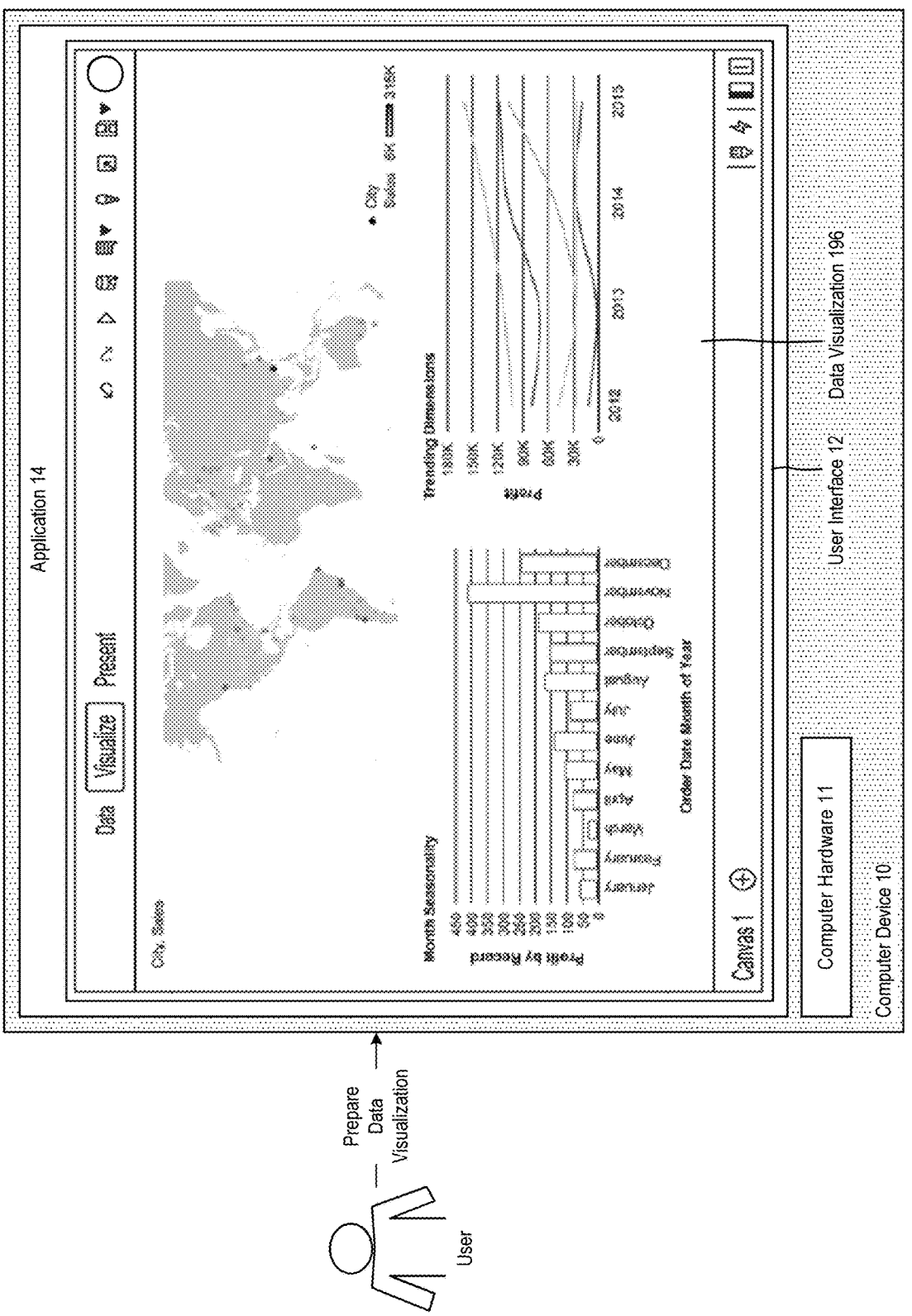
FIG. 8 further illustrates the preparation of a data visualization for use with a data analytics environment, in accordance with an embodiment.

FIG. 8 further illustrates the preparation of a data visualization for use with a data analytics environment, in accordance with an embodiment.

As illustrated in FIG. 8, in accordance with an embodiment, the user can continue adding data elements directly to the canvas to build the visualization. In this manner, a dataset operates as a self-service data model from which the user can build a data analysis or visualization. The user can then use the data visualization to access the data analytics environment, for example to submit analyses or queries against an organization's data.

The user interfaces and features shown in FIGS. 7-8 and elsewhere herein are provided by way of example, for purposes of illustration of the various features described herein; in accordance with various embodiments, alternative examples of user interfaces and features can be provided.

Data Visualization Scores

In accordance with an embodiment, the system can operate in the manner of an expert system, or according to a series of processes or rules, to examine a data visualization of interest, compare a list of found elements with element types specified by an analytics data visualization score matrix, and generate, based on matching found elements with the analytics data visualization matrix, a data visualization score associated with the data visualization.

In accordance with an embodiment, the system can operate as a data visualization advisor, during preparation of a data visualization, to provide a user with recommendations or score values indicative of a quality or complexity of their data visualization, which may be helpful in improving their data visualization, for example from a beginner-level to a more advanced-level.

In accordance with an embodiment, the techniques described herein can be applied to various aspects of data visualization, such as dashboards, infographics, data visualizations, or reports.

Generally described, in accordance with an embodiment, a report can be a structured presentation of data, with text, table or pivot table, and can be used for in-depth analysis and static permanent record. A dashboard can be a real-time interactive interface allowing for quick decision-making. An infographic can be a static visual image highly designed. A data visualization can be a graphical representation of the data, and can comprise part of a dashboard or infographic.

Figure 9:
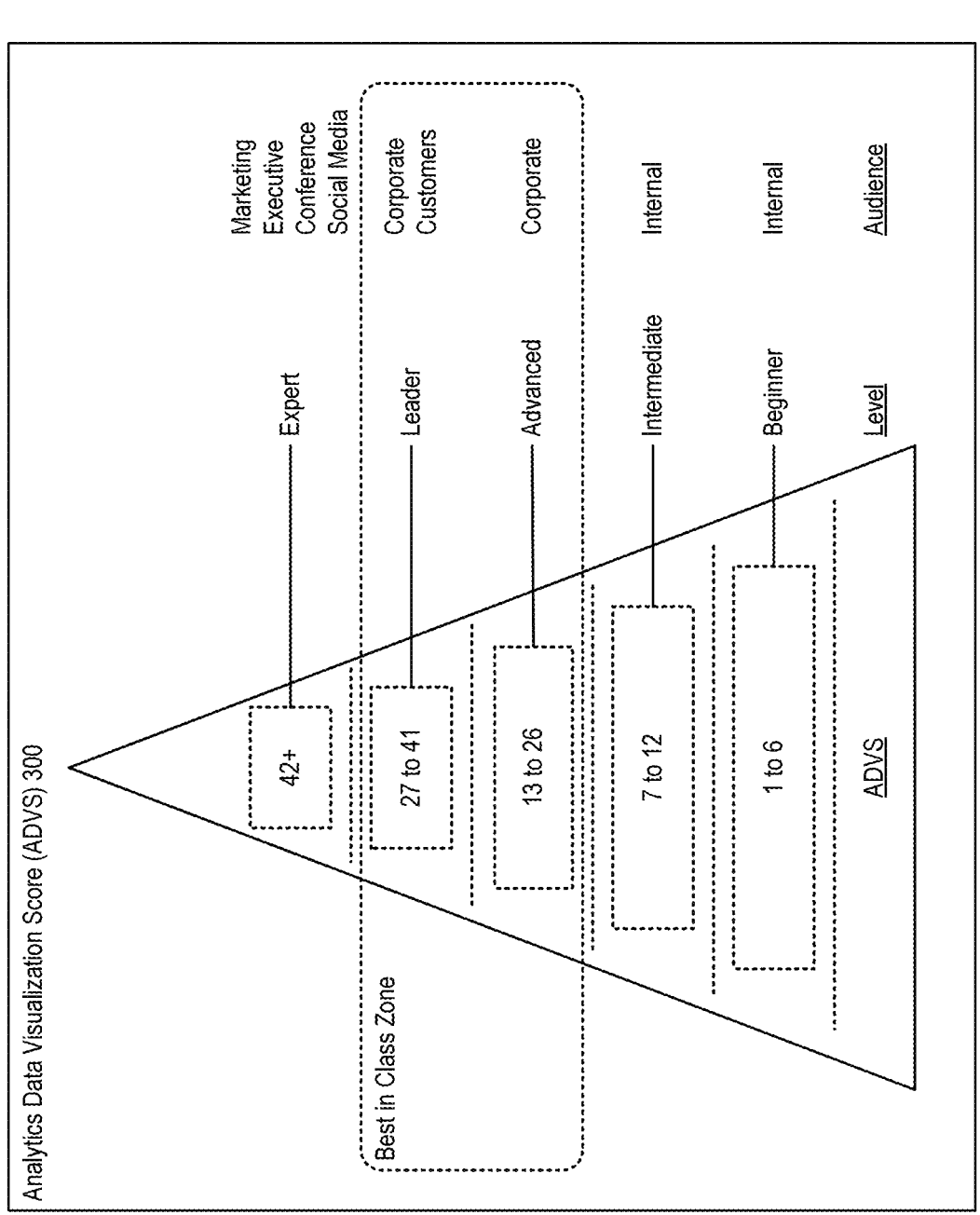
FIG. 9 illustrates the use of analytics data visualization scores, for assessing data visualizations, in accordance with an embodiment.

FIG. 9 illustrates the use of analytics data visualization scores, for assessing data visualizations, in accordance with an embodiment.

As illustrated in FIG. 9, in accordance with an embodiment, data visualizations should be simple, easy to read, and actionable to enable decisions. Data visualizations may be evaluated on clarity, data integrity, design, utility, interactivity, readability, density, and insights. The use of an analytics data visualization score matrix, to determine an analytics data visualization score (ADVS) 300, allows an author to see the level of data visualization from beginner to expert.

For example, in accordance with an embodiment, a beginner-level data visualization may be associated with an analytics data visualization score from 1 to 6, and may be appropriate for use by an internal or personal audience.

In accordance with an embodiment, an intermediate-level data visualization may be associated with an analytics data visualization score from 7 to 12, and may likewise be appropriate for use by an internal audience, such as shared in a team or meeting.

In accordance with an embodiment, an advanced-level data visualization may be associated with an analytics data visualization score from 13 to 26, and may be appropriate for use by a corporate audience, or shared within an organization.

In accordance with an embodiment, a leader-level data visualization may be associated with an analytics data visualization score from 27 to 41, and may be appropriate for use by an audience of senior level corporate representatives, partners, or customers.

In accordance with an embodiment, an expert-level data visualization may be associated with an analytics data visualization score greater than 42, and may be appropriate for use with marketing or executive audiences, or for use with conferences or social media.

In accordance with an embodiment, some data visualization objects, for example, AI or NLG, contribute greater weighting or amount of point values to the overall analytics data visualization score associated with the data visualization.

Generally described, in accordance with an embodiment, the variations in levels reflect variations in quality and/or complexity of a data visualization. As illustrated in FIG. 5, the best in class zone for corporate users is to have their data visualization at the advanced or leader level. Such a level may not be required in other settings, for example an internal team meeting.

FIG. 10 illustrates a method for generating data visualization scores, for use with data analytics environments, in accordance with an embodiment.

As illustrated in FIGS. 10, in accordance with an embodiment, at step 302, an analytics data visualization score (ADVS) matrix is provided that includes a listing or specification of data visualization element types and weighting or amount of point values associated therewith.

At step 304, the system can receive a request (for example, within a data analytics workbook canvas) to assess a data visualization of interest.

At step 306, the system can examine the data visualization of interest (for example, as defined by an associated JSON, XML, software code, or metadata) to prepare a matrix or list of found elements within the data visualization.

At step 308, the system can compare the matrix or list of found elements within the data visualization of interest, with the element types and weighting or amount of point values specified by the ADVS matrix.

At step 310, the system can generate, based on a matching of found elements with the ADVS matrix, a data visualization score that is associated with the data visualization of interest (for example, to provide a recommendation, or to display within a user interface a changeable icon and/or score value indicative of a quality and/or complexity of the data visualization).

For example, in accordance with an embodiment, the system can examine the data visualization of interest as defined by, for example, an associated JSON, to prepare a matrix or list of found elements within the data visualization, for example:

```
{
  "criteria": {
    "columns": {
      "children": [
        {
          "columnID: "NegativeProfit",
          "userExpression": true,
          "type": "saw:regularColumn",
          "columnFormula": {
            "expr": {
              "children": [ ],
              "type": "sawx:sqlExpression",
              "expression": "-XSA{'Benjamin'.'New Dataset'}.\
                "New Data Set\".\"Profit\""
              ...
  }
```

In accordance with an embodiment, the system can examine the data visualization of interest as defined by, for example, a corresponding XML, to prepare a matrix or list of found elements within the data visualization, for example:

```
<saw:report xmlns:saw="..." xmlns:sawx="..." xmlns:xsl="..." xmlns:xsd="...">
<saw:criteria xsi:type="saw.simpleCriteria"
    subjectArea="XSA('Benjamin'.'New Dataset')">
  <saw:columns>
  <saw:column columnID="NegativeProfit" xsi:type="saw:regularColumn"
      userExpression="true">
  <saw:columnFormula>
    <sawx:expr xsi:type="sawx:sqlExpression">
    -XSA('Benjamin'.'New Dataset').
    "New Data Set"."Profit"</sawx:expr></saw:columnFormula>
    <saw:columnHeading>
    <saw:caption>
    <saw:text>Negative Profit
    </saw:text></saw:caption></saw:columnHeading></saw:column>
```

The above examples of JSON and XML are provided by way of example, in accordance with an embodiment and to illustrate the techniques described herein. In accordance with other embodiments, the system can use other sources of information associated with the data visualization of interest, such as for example, an associated software code or metadata, to prepare a matrix or list of found elements within the data visualization.

Figure 11:
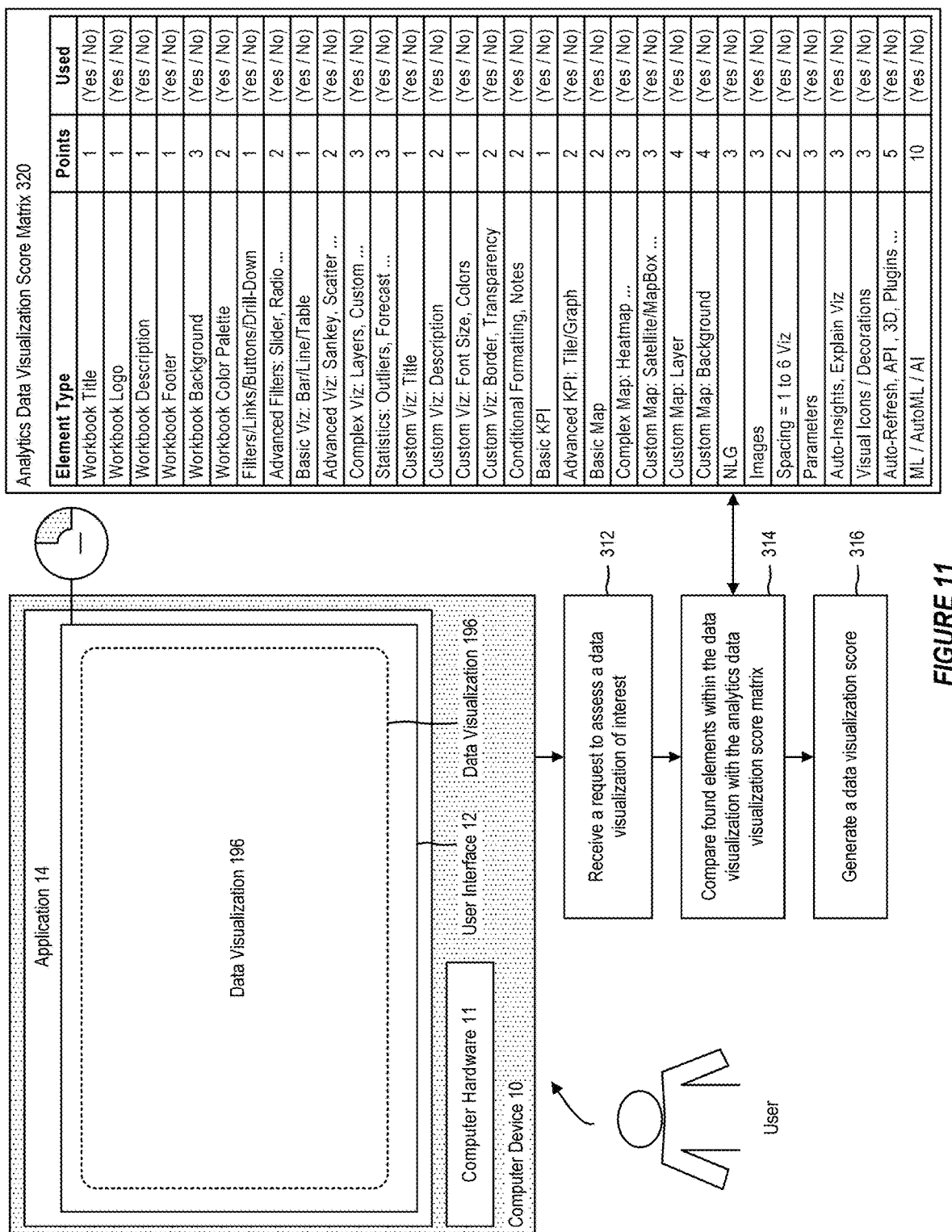
FIG. 11 illustrates how the system can be used to generate data visualization scores, in accordance with an embodiment.

FIG. 11 illustrates how the system can be used to generate data visualization scores, in accordance with an embodiment.

As illustrated in FIG. 11, in accordance with an embodiment, the system can, at step 312, receive a request to assess a data visualization of interest; at step 314, compare found elements within the data visualization with an analytics data visualization score matrix 320, an example of which is illustrated in Table 1; each of which can be associated with a weighting or amount of point values indicative of their relative importance in assessing a data visualization; and, at step 316, generate a data visualization (DV) score.

TABLE 1

| Element Type | Points | Used |
|---|---|---|
| Workbook Title | 1 | (Yes/No) |
| Workbook Logo | 1 | (Yes/No) |
| Workbook Description | 1 | (Yes/No) |

TABLE 1-continued

| Element Type | Points | Used |
|---|---|---|
| Workbook Footer | 1 | (Yes/No) |
| Workbook Background | 3 | (Yes/No) |
| Workbook Color Palette | 2 | (Yes/No) |
| Filters/Links/Buttons/Drill Down | 1 | (Yes/No) |
| Advanced Filters: Slider, Radio . . . | 2 | (Yes/No) |
| Basic Viz: Bar/Line/Table . . . | 1 | (Yes/No) |
| Advanced Viz: Sankey, Scatter . . . | 2 | (Yes/No) |
| Complex Viz: Layers, Custom . . . | 3 | (Yes/No) |
| Statistics: Outliers, Forecast . . . | 3 | (Yes/No) |
| Custom Viz: Title | 1 | (Yes/No) |
| Custom Viz: Description | 2 | (Yes/No) |
| Custom Viz: Font Size, Colors | 1 | (Yes/No) |
| Custom Viz: Border, Transparency | 2 | (Yes/No) |
| Conditional Formatting, Notes | 2 | (Yes/No) |
| Basic KPI | 1 | (Yes/No) |
| Advanced KPI: Tile/Graph | 2 | (Yes/No) |
| Basic Map | 2 | (Yes/No) |
| Complex Map: Heatmap . . . | 3 | (Yes/No) |
| Custom Map: Satellite/MapBox . . . | 3 | (Yes/No) |
| Custom Map: Layer | 4 | (Yes/No) |
| Custom Map: Background | 4 | (Yes/No) |
| NLG | 3 | (Yes/No) |
| Images | 3 | (Yes/No) |
| Spacing/1 to 6 Viz | 2 | (Yes/No) |
| Parameters | 3 | (Yes/No) |

TABLE 1-continued

| Element Type | Points | Used |
|---|---|---|
| Auto-Insights, Explain Viz | 3 | (Yes/No) |
| Visual Icons/Decorations | 3 | (Yes/No) |
| Auto-Refresh, API, 3D, Plugins . . . | 5 | (Yes/No) |
| ML/AutoML/AI | 10 | (Yes/No) |

As illustrated in FIG. 11, in accordance with an embodiment, the analytics data visualization score matrix illustrated therein accommodate 32 groups of elements; each group of elements referencing a data visualization element available in the data analytics environment. Some elements are available in other software products; some elements are available in other data analytics products; and some elements may be specific to particular data analytics environments, such as: NLG, parameters, auto-insights, custom map background, conditional formatting and notes.

In accordance with an embodiment, the analytics data visualization score matrix can be initially prepared by a subject matter expert, based on their experience of working with many types of data visualizations.

In accordance with other embodiments, the analytics data visualization score matrix can be generated grammatically or automatically by the system using a training set of data visualizations which have been assessed as being of varying levels, and/or by using machine learning or other machine or computer-automated techniques to determine relevant element types and determining weighting or amount of point values and/or rules associated therewith for purposes of creating the matrix.

In accordance with other embodiments, the analytics data visualization score matrix can be generated or modified based on or taking into account community feedback, or telemetry information reflecting usage of the system by its users, as to which data visualization element types may be most relevant, e.g., within a particular corporate team, organization, or community, or which data visualizations may be most useful or are most commonly accessed or used within that community.

FIG. 12 further illustrates how the system can be used to generate data visualization scores, in accordance with an embodiment.

As illustrated in FIG. 12, in accordance with an embodiment, the system can generate, based on a matching of found elements with the analytics data visualization score matrix, a data visualization score that is associated with the data visualization of interest (for example, to provide a recommendation, or to display within a user interface a score (in this example a value of "5") indicative of a quality and/or complexity of the data visualization), In accordance with an embodiment, the data visualization score can be displayed within a user interface as a changeable icon and/or score value indicative of a quality and/or complexity of the data visualization, for example as a donut-type key performance indicator (KPI) device, with an included score and/or in variable colors, to show the user how their dashboard or visualization level is assessed or ranked by the system. The system can also provide additional recommendations on how the user may improve their data visualization to increase the value of the insights and understanding being provided.

FIG. 13 illustrates an example use of generating data visualization scores, in accordance with an embodiment.

As illustrated in FIG. 13, the system can assess a data visualization of interest, and compare found elements within the data visualization, as summarized in Table 2, with an analytics data visualization score matrix, to determine a data visualization (DV) score.

TABLE 2

| Element Type | Points | Used |
| --- | --- | --- |
| Workbook Title | 1 | |
| Workbook Logo | 1 | |
| Workbook Description | 1 | |
| Workbook Footer | 1 | |
| Workbook Background | 3 | |
| Workbook Color Palette | 2 | |
| Filters/Links/Buttons/Drill Down | 1 | |
| Advanced Filters: Slider, Radio . . . | 2 | |
| Basic Viz: Bar/Line/Table . . . | 1 | Yes |
| Advanced Viz: Sankey, Scatter . . . | 2 | |
| Complex Viz: Lavers, Custom . . . | 3 | |
| Statistics: Outliers, Forecast . . . | 3 | |
| Custom Viz: Title | 1 | |
| Custom Viz: Description | 2 | |
| Custom Viz: Font Size, Colors | 1 | |
| Custom Viz: Border, Transparency | 2 | |
| Conditional Formatting, Notes | 2 | |
| Basic KPI | 1 | |
| Advanced KPI: Tile/Graph | 2 | |
| Basic Map | 2 | Yes |
| Complex Map: Heatmap . . . | 3 | |
| Custom Map: Satellite/MapBox . . . | 3 | |
| Custom Map: Layer | 4 | |

TABLE 2-continued

| Element Type | Points | Used |
| --- | --- | --- |
| Custom Map: Background | 4 | |
| NLG | 3 | |
| Images | 3 | |
| Spacing/1 to 6 Viz | 2 | Yes |
| Parameters | 3 | |
| Auto-Insights, Explain Viz | 3 | |
| Visual Icons/Decorations | 3 | |
| Auto-Refresh, API, 3D, Plugins . . . | 5 | |
| ML/AutoML/AI | 10 | |

In accordance with an embodiment, the system in assessing the data visualization illustrated therein by way of example can assess, for example:

1 point for using line and bar chart visualizations.

2 points for using a basic map.

2 points for spacing visualizations elements and putting less than 6 in one canvas.

In this example, the system determines the data visualization as having a DV score of (1+2+2), resulting in an overall value for DV score of "5", which corresponds to a beginner-level data visualization. This example data visualization may be considered good for readability but difficult to understand as no title is provided, and there is no context, no footer showing the data sources and author name, no interactivity, no customized title, no customized font and color, no advanced analytics such as forecast, outliers or ML/AI, and no visual decorations.

As described above, in accordance with an embodiment, the system can then use the data visualization score, for example, to provide a recommendation or display within a user interface a changeable icon and/or score value indicative of a quality and/or complexity of the data visualization.

Figure 14A:
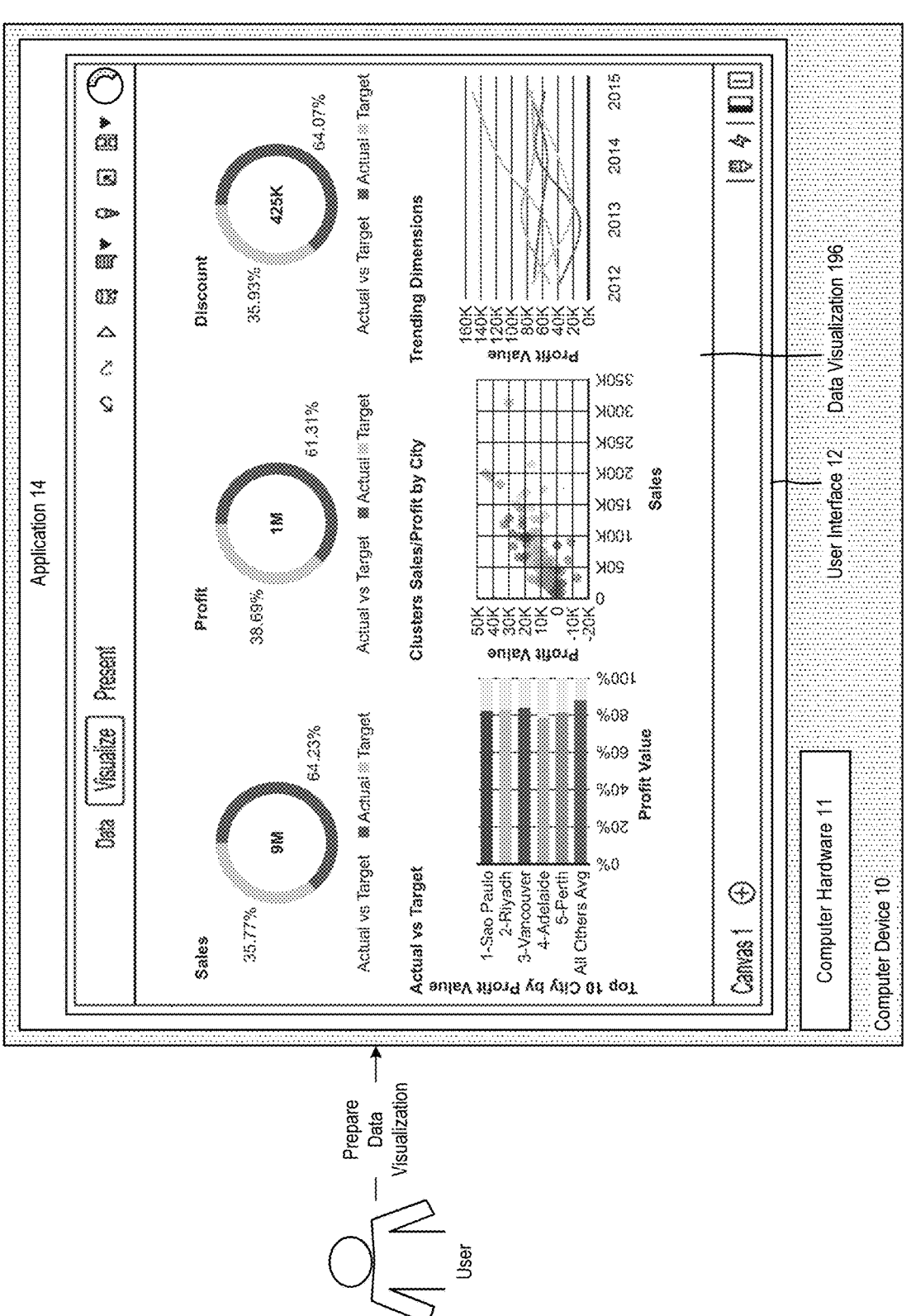
FIG. 14A illustrates another example use of generating data visualization scores, in accordance with an embodiment.

FIGS. 14A-14B illustrate another example use of generating data visualization scores, in accordance with an embodiment.

As illustrated in FIGS. 14A-14B, the system can assess a data visualization of interest, and compare found elements within the data visualization, as summarized in Table 3, with an analytics data visualization score matrix, to determine a data visualization (DV) score.

TABLE 3

| Element Type | Points | Used |
| --- | --- | --- |
| Workbook Title | 1 | |
| Workbook Logo | 1 | |
| Workbook Description | 1 | |
| Workbook Footer | 1 | |
| Workbook Background | 3 | |
| Workbook Color Palette | 2 | Yes |
| Filters/Links/Buttons/Drill Down | 1 | |
| Advanced Filters: Slider, Radio . . . | 2 | |
| Basic Viz: Bar/Line/Table . . . | 1 | |
| Advanced Viz: Sankey, Scatter . . . | 2 | Yes |
| Complex Viz: Layers, Custom . . . | 3 | |
| Statistics: Outliers, Forecast . . . | 3 | Yes |
| Custom Viz: Title | 1 | Yes |
| Custom Viz: Description | 2 | |
| Custom Viz: Font Size, Colors | 1 | |
| Custom Viz: Border, Transparency | 2 | |
| Conditional Formatting, Notes | 2 | |
| Basic KPI | 1 | |
| Advanced KPI: Tile/Graph | 2 | |
| Basic Map | 2 | |
| Complex Map: Heatmap . . . | 3 | |
| Custom Map: Satellite/MapBox . . . | 3 | |
| Custom Map: Layer | 4 | |
| Custom Map: Background | 4 | |

TABLE 3-continued

| Element Type | Points | Used |
|---|---|---|
| NLG | 3 | |
| Images | 3 | |
| Spacing/1 to 6 Viz | 2 | Yes |
| Parameters | 3 | |
| Auto-Insights, Explain Viz | 3 | |
| Visual Icons/Decorations | 3 | |
| Auto-Refresh, API, 3D, Plugins . . . | 5 | |
| ML/AutoML/AI | 10 | |

In accordance with an embodiment, the system in assessing the data visualization illustrated therein by way of example can assess, for example:

2 points for workbook custom color palette.

2 points for advanced data visualizations such as scatter plot and skinny donut.

3 points for use of outliers.

1 point for custom title for visualizations.

2 points for spacing.

In this example, the system determines the data visualization as having a DV score of (2+2+3+1+2), resulting in an overall value for DV score of "10", which corresponds to an intermediate-level data visualization, and reflects an intermediate-level data visualization with customizations and advanced analytics.

As described above, in accordance with an embodiment, the system can then use the data visualization score, for example, to provide a recommendation or display within a user interface a changeable icon and/or score value indicative of a quality and/or complexity of the data visualization.

Figure 15A:
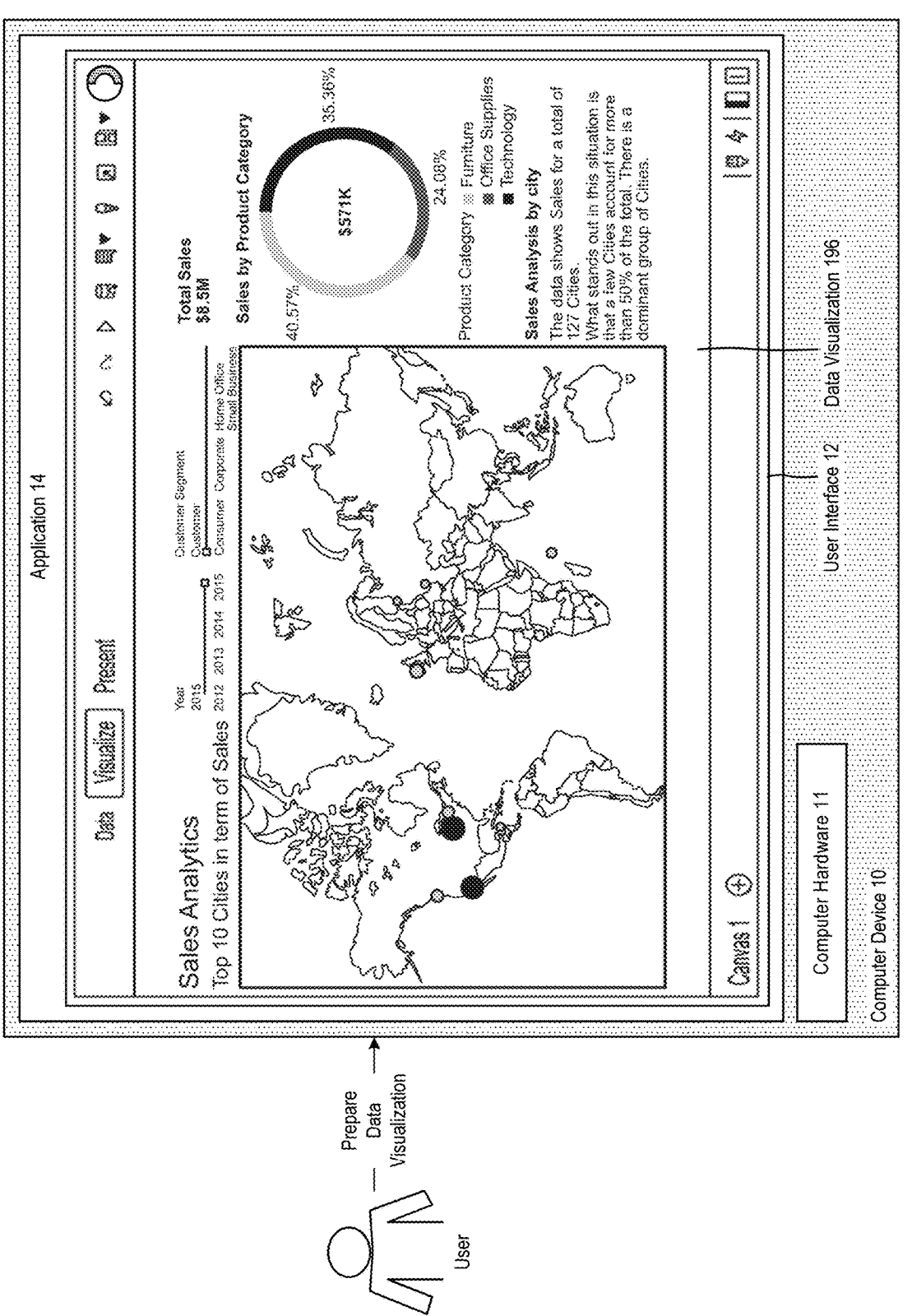
FIG. 15A illustrates another example use of generating data visualization scores, in accordance with an embodiment.

FIGS. 15A-15B illustrate another example use of generating data visualization scores, in accordance with an embodiment.

As illustrated in FIGS. 15A-15B, the system can assess a data visualization of interest, and compare found elements within the data visualization, as summarized in Table 4, with an analytics data visualization score matrix, to determine a data visualization (DV) score.

TABLE 4

| Element Type | Points | Used |
|---|---|---|
| Workbook Title | 1 | Yes |
| Workbook Logo | 1 | |
| Workbook Description | 1 | |
| Workbook Footer | 1 | Yes |
| Workbook Background | 3 | Yes |
| Workbook Color Palette | 2 | Yes |
| Filters/Links/Buttons/Drill Down | 1 | |
| Advanced Filters: Slider, Radio . . . | 2 | Yes |
| Basic Viz: Bar/Line/Table . . . | 1 | |
| Advanced Viz: Sankey, Scatter . . . | 2 | |
| Complex Viz: Layers, Custom . . . | 3 | Yes |
| Statistics: Outliers, Forecast . . . | 3 | |
| Custom Viz: Title | 1 | Yes |
| Custom Viz: Description | 2 | |
| Custom Viz: Font Size, Colors | 1 | Yes |
| Custom Viz: Border, Transparency | 2 | |
| Conditional Formatting, Notes | 2 | |
| Basic KPI | 1 | Yes |
| Advanced KPI: Tile/Graph | 2 | |
| Basic Map | 2 | |
| Complex Map: Heatmap . . . | 3 | |
| Custom Map: Satellite/MapBox . . . | 3 | Yes |
| Custom Map: Layer | 4 | |
| Custom Map: Background | 4 | |
| NLG | 3 | Yes |
| Images | 3 | |
| Spacing/1 to 6 Viz | 2 | Yes |

TABLE 4-continued

| Element Type | Points | Used |
|---|---|---|
| Parameters | 3 | |
| Auto-Insights, Explain Viz | 3 | |
| Visual Icons/Decorations | 3 | |
| Auto-Refresh, API, 3D, Plugins . . . | 5 | |
| ML/AutoML/AI | 10 | |

In this example, the system determines the data visualization as having a DV score of (1+1+3+2+2+3+1+1+1+3+3+2), resulting in an overall value for DV score of "23", which corresponds to an advanced-level data visualization.

As described above, in accordance with an embodiment, the system can then use the data visualization score, for example, to provide a recommendation or display within a user interface a changeable icon and/or score value indicative of a quality and/or complexity of the data visualization.

Figure 16A:
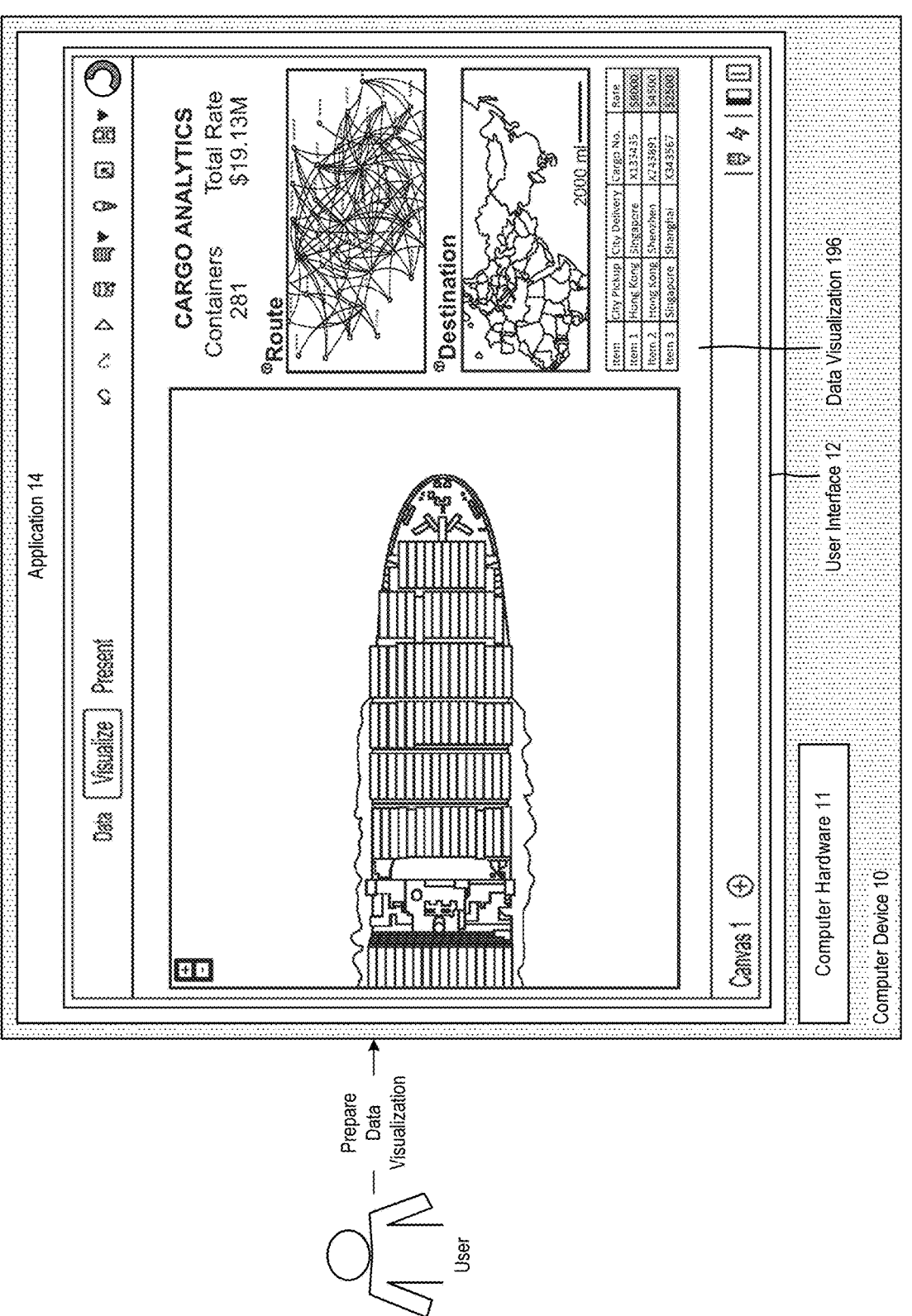
FIG. 16A illustrates another example use of generating data visualization scores, in accordance with an embodiment.

FIGS. 16A-16B illustrate another example use of generating data visualization scores, in accordance with an embodiment.

As illustrated in FIGS. 16A-16B, the system can assess a data visualization of interest, and compare found elements within the data visualization, as summarized in Table 5, with an analytics data visualization score matrix, to determine a data visualization (DV) score.

TABLE 5

| Element Type | Points | Used |
|---|---|---|
| Workbook Title | 1 | Yes |
| Workbook Logo | 1 | |
| Workbook Description | 1 | |
| Workbook Footer | 1 | |
| Workbook Background | 3 | |
| Workbook Color Palette | 2 | Yes |
| Filters/Links/Buttons/Drill Down | 1 | Yes |
| Advanced Filters: Slider, Radio . . . | 2 | |
| Basic Viz: Bar/Line/Table . . . | 1 | Yes |
| Advanced Viz: Sankey, Scatter . . . | 2 | Yes |
| Complex Viz: Layers, Custom . . . | 3 | |
| Statistics: Outliers, Forecast . . . | 3 | |
| Custom Viz: Title | 1 | Yes |
| Custom Viz: Description | 2 | |
| Custom Viz: Font Size, Colors | 1 | Yes |
| Custom Viz: Border, Transparency | 2 | |
| Conditional Formatting, Notes | 2 | Yes |
| Basic KPI | 1 | Yes |
| Advanced KPI: Tile/Graph | 2 | |
| Basic Map | 2 | Yes |
| Complex Map: Heatmap . . . | 3 | Yes |
| Custom Map: Satellite/MapBox . . . | 3 | |
| Custom Map: Layer | 4 | Yes |
| Custom Map: Background | 4 | Yes |
| NLG | 3 | |
| Images | 3 | |
| Spacing/1 to 6 Viz | 2 | Yes |
| Parameters | 3 | |
| Auto-Insights, Explain Viz | 3 | |
| Visual Icons/Decorations | 3 | |
| Auto-Refresh, API, 3D, Plugins . . . | 5 | Yes |
| ML/AutoML/AI | 10 | |

In this example, the system determines the data visualization as having a DV score of (1+2+1+1+2+1+1+2+1+2+3+4+4+2+5), resulting in an overall value for DV score of "32", which corresponds to a leader-level data visualization.

As described above, in accordance with an embodiment, the system can then use the data visualization score, for example, to provide a recommendation or display within a user interface a changeable icon and/or score value indicative of a quality and/or complexity of the data visualization.

Figure 17A:
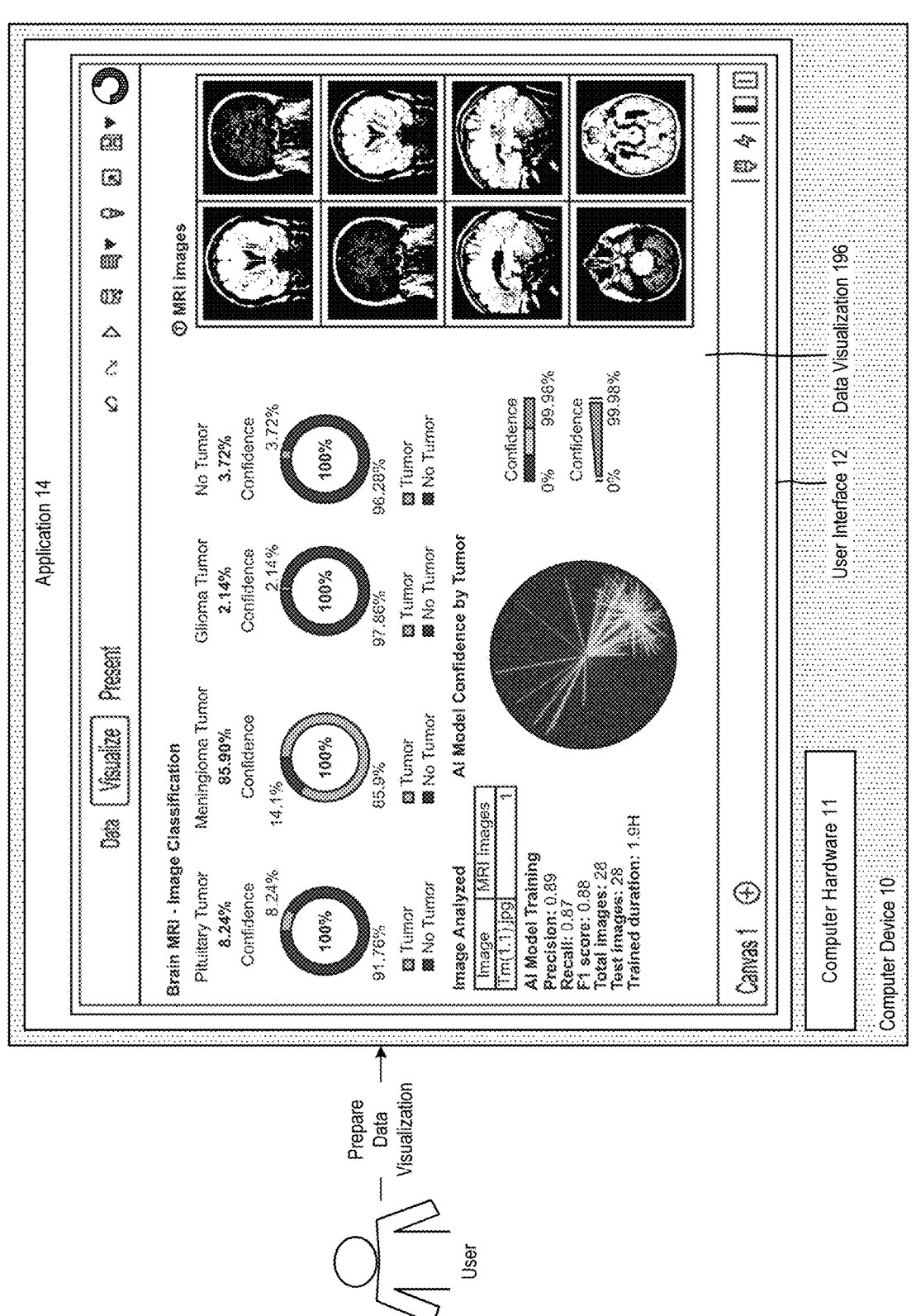
FIG. 17A illustrates another example use of generating data visualization scores, in accordance with an embodiment.

FIGS. 17A-17B illustrate another example use of generating data visualization scores, in accordance with an embodiment.

As illustrated in FIGS. 17A-17B, the system can assess a data visualization of interest, and compare found elements within the data visualization, as summarized in Table 6, with an analytics data visualization score matrix, to determine a data visualization (DV) score.

TABLE 6

| Element Type | Points | Used |
|---|---|---|
| Workbook Title | 1 | Yes |
| Workbook Logo | 1 | Yes |
| Workbook Description | 1 | Yes |
| Workbook Footer | 1 | Yes |
| Workbook Background | 3 | Yes |
| Workbook Color Palette | 2 | Yes |
| Filters/Links/Buttons/Drill Down | 1 | Yes |
| Advanced Filters: Slider, Radio . . . | 2 | |
| Basic Viz: Bar/Line/Table . . . | 1 | |
| Advanced Viz: Sankey, Scatter . . . | 2 | Yes |
| Complex Viz: Layers, Custom . . . | 3 | Yes |
| Statistics: Outliers, Forecast . . . | 3 | |
| Custom Viz: Title | 1 | Yes |
| Custom Viz: Description | 2 | Yes |
| Custom Viz: Font Size, Colors | 1 | Yes |
| Custom Viz: Border, Transparency | 2 | Yes |
| Conditional Formatting, Notes | 2 | Yes |
| Basic KPI | 1 | Yes |
| Advanced KPI: Tile/Graph | 2 | |
| Basic Map | 2 | |
| Complex Map: Heatmap . . . | 3 | |
| Custom Map: Satellite/MapBox . . . | 3 | |
| Custom Map: Layer | 4 | |
| Custom Map: Background | 4 | |
| NLG | 3 | |
| Images | 3 | Yes |
| Spacing/1 to 6 Viz | 2 | |
| Parameters | 3 | |
| Auto-Insights, Explain Viz | 3 | |
| Visual Icons/Decorations | 3 | |
| Auto-Refresh, API, 3D, Plugins . . . | 5 | Yes |
| ML/AutoML/AI | 10 | Yes |

In this example, the system determines the data visualization as having a DV score of (1+1+1+1+3+2+1+2+3+1+2+1+2+2+1+3+5+10), resulting in an overall value for DV score of "42", which corresponds to an expert-level data visualization.

As described above, in accordance with an embodiment, the system can then use the data visualization score, for example, to provide a recommendation or display within a user interface a changeable icon and/or score value indicative of a quality and/or complexity of the data visualization.

Figure 18:
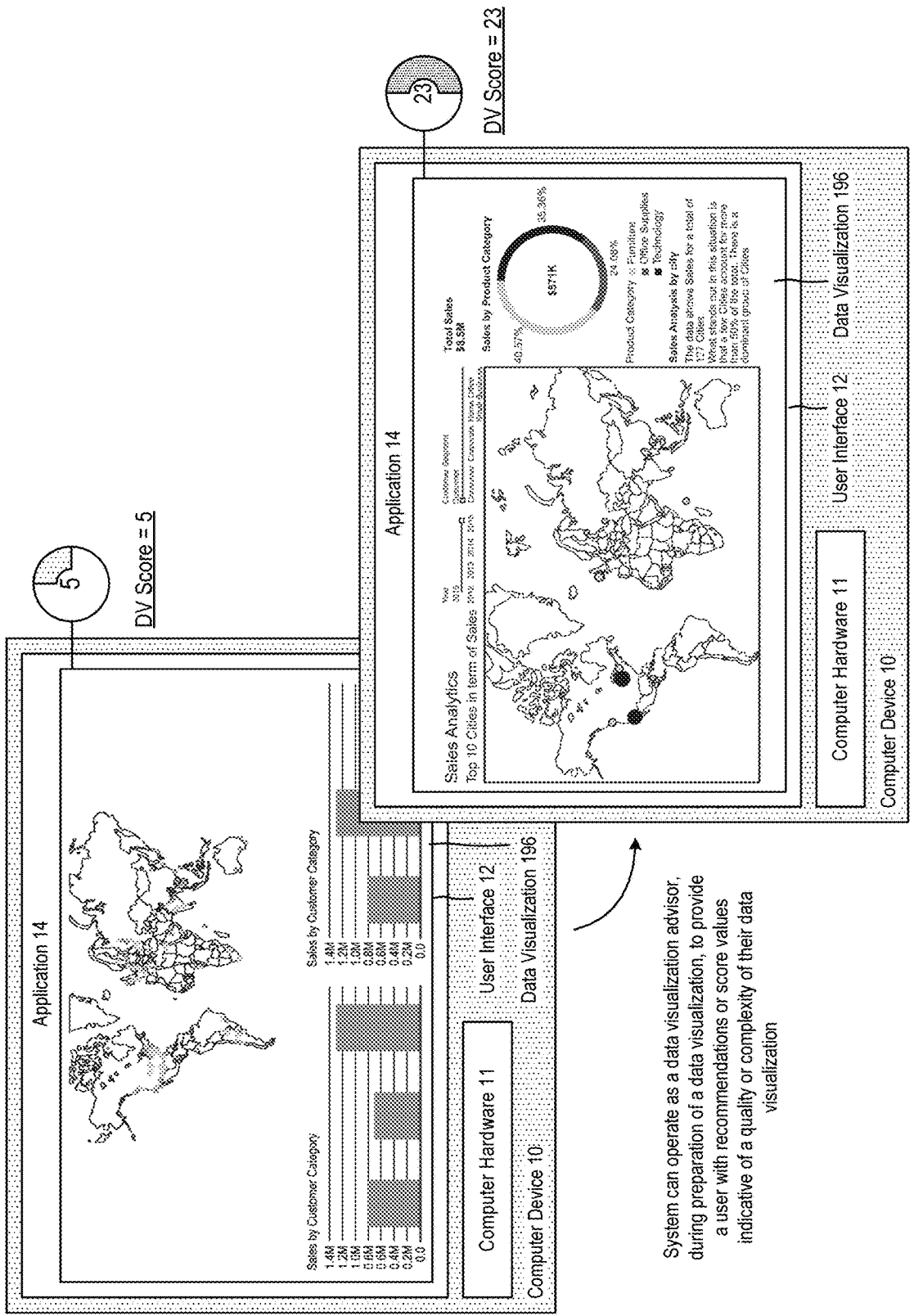
FIG. 18 illustrates how the system and method for generating data visualization scores can be used, for example, to improve the quality and complexity of a data visualization, in accordance with an embodiment.

FIG. 18 illustrates how the system and method for generating data visualization scores can be used, for example, to improve the quality and complexity of a data visualization, in accordance with an embodiment.

As illustrated in FIG. 18, in accordance with an embodiment, the system can operate as a data visualization advisor, during preparation of a data visualization, to provide a user with recommendations or score values indicative of a quality or complexity of their data visualization, which may be helpful in improving their data visualization, for example from a beginner-level to a more advanced-level.

For example, as illustrated in FIG. 19, in accordance with an embodiment, at step 232, the system can receive a request (for example, within a data analytics workbook canvas) to assess a data visualization being prepared.

At step 334, the system can examine the data visualization being prepared, and compare a matrix or list of found elements with the element types and weighting or amount of point values specified by an ADVS matrix.

At step 336, the system can generate, based on a matching of found elements with the ADVS matrix, a data visualization score that is associated with the data visualization being prepared, and provide a recommendation, or display within a user interface a changeable icon and/or score value indicative of a quality and/or complexity of the data visualization.

At step 338, the system can receive changes associated with the data visualization, indicative of a revised data visualization.

At step 340, the system can generate a data visualization score associated with the revised data visualization, and repeat the process as appropriate, to provide a user with recommendations or score values indicative of a quality or complexity of their data visualization during preparation.

In accordance with various embodiments, the systems and methods described herein can be implemented using one or more computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate operation with an enterprise software application or data analytics environment such as, for example, an Oracle Analytics Cloud environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for generating data visualization scores, comprising:

a computer including one or more processors, that provides access to a data analytics environment, wherein the data analytics environment comprises a query engine that operates to process queries against a database according to a query execution plan, wherein the query engine creates the query execution plan responsive to a request for data analytics or visualization information received via a client application and user interface and communicated to the data analytics environment, wherein the system retrieves an appropriate dataset to address a user or business context, for use in generating and returning the requested data analytics or visualization information to the client, as a data visualization;

wherein the data analytics environment includes an analytics data visualization score matrix generated grammatically or automatically by the system using a training set of data visualizations assessed as being of varying levels or by using machine learning or other machine or computer-automated techniques to determine relevant element types, and determining a weighting or amount of point values or rules associated therewith, for purposes of creating the matrix, said weighting or amount of point values indicative of their relative importance in assessing a data visualization;

wherein the computer operates to:

receive a request to assess a data visualization of interest, wherein the data visualization is defined by one or more associated JSON, XML, software code, or metadata;

examine the data visualization of interest to prepare a matrix or list of found elements within the data visualization as defined by its associated JSON, XML, software code, or metadata;

compare the matrix or list of found elements within the data visualization of interest, with the element types and weighting or amount of point values specified by the analytics data visualization score matrix; and generate, based on a matching of found elements with the analytics data visualization score matrix, a data visualization score associated with the data visualization of interest;

wherein the system operates as a data visualization advisor, during preparation of a data visualization, to provide a user with recommendations or score values indicative of a quality or complexity of their data visualization.

2. The system of claim 1, wherein the system operates as an expert system, or according to a series of processes or rules, to:

examine the data visualization as defined by its associated JSON, XML, software code, or metadata; and compare the matrix or list of found elements within the data visualization of interest, with the element types and weighting or amount of point values specified by the analytics data visualization score matrix, and provide recommendations associated with the data visualization.

3. The system of claim 1, wherein the data visualization score is displayed within a user interface as a changeable icon and/or score value indicative of a quality and/or complexity associated with the data visualization of interest.

4. The system of claim 1, wherein the system is provided within a cloud computing or data analytics environment.

5. A method performed by a system for generating data visualization scores, comprising:

providing, by a computer including one or more processors, access to a data analytics environment, wherein the data analytics environment comprises a query engine that operates to process queries against a database according to a query execution plan, wherein the query engine creates the query execution plan responsive to a request for data analytics or visualization information received via a client application and user interface and communicated to the data analytics environment, cation and user interface and communicated to the data analytics environment, wherein the system retrieves an appropriate dataset to address a user or business context, for use in generating and returning the requested data analytics or visualization information to the client, as a data visualization;

wherein the data analytics environment includes an analytics data visualization score matrix generated grammatically or automatically by the system using a training set of data visualizations assessed as being of varying levels or by using machine learning or other machine or computer-automated techniques to determine relevant element types, and determining a weighting or amount of point values or rules associated therewith, for purposes of creating the matrix, said weighting or amount of point values indicative of their relative importance in assessing a data visualization;

receiving a request to assess a data visualization of interest, wherein the data visualization is defined by one or more associated JSON, XML, software code, or metadata;

examining the data visualization of interest to prepare a matrix or list of found elements within the data visualization as defined by its associated JSON, XML, software code, or metadata;

comparing the matrix or list of found elements within the data visualization of interest, with element types and weighting or amount of point values specified by the analytics data visualization score matrix; and generating, based on a matching of found elements with the analytics data visualization score matrix, a data visualization score associated with the data visualization of interest;

wherein the method is performed by a data visualization advisor, during preparation of a data visualization, to provide a user with recommendations or score values indicative of a quality or complexity of their data visualization.

6. The method of claim 5, wherein the method operates as an expert system, or according to a series of processes or rules, to:

examine the data visualization as defined by its associated JSON, XML, software code, or metadata; and compare the matrix or list of found elements within the data visualization of interest, with the element types and weighting or amount of point values specified by the analytics data visualization score matrix, and provide recommendations associated with the data visualization.

7. The method of claim 5, wherein the data visualization score is displayed within a user interface as a changeable icon and/or score value indicative of a quality and/or complexity associated with the data visualization of interest.

8. The method of claim 5, wherein the method is performed by or within a cloud computing or data analytics environment.

9. A non-transitory computer readable storage medium having instructions thereon, which when read and executed by a system comprising a computer including one or more processors cause the computer to perform a method comprising:

providing, by the computer, access to a data analytics environment, wherein the data analytics environment comprises a query engine that operates to process queries against a database according to a query execution plan, wherein the query engine creates the query execution plan responsive to a request for data analytics or visualization information received via a client application and user interface and communicated to the data analytics environment, wherein the system retrieves an appropriate dataset to address a user or business context, for use in generating and returning the requested data analytics or visualization information to the client, as a data visualization;

wherein the data analytics environment includes an analytics data visualization score matrix generated grammatically or automatically by the system using a training set of data visualizations assessed as being of varying levels or by using machine learning or other machine or computer-automated techniques to determine relevant element types, and determining a weighting or amount of point values or rules associated therewith, for purposes of creating the matrix, said weighting or amount of point values indicative of their relative importance in assessing a data visualization;

receiving a request to assess a data visualization of interest, wherein the data visualization is defined by one or more associated JSON, XML, software code, or metadata;

examining the data visualization of interest to prepare a matrix or list of found elements within the data visualization as defined by its associated JSON, XML, software code, or metadata;

comparing the matrix or list of found elements within the data visualization of interest, with element types and weighting or amount of point values specified by the analytics data visualization score matrix; and generating, based on a matching of found elements with the analytics data visualization score matrix, a data visualization score associated with the data visualization of interest;

wherein the method is performed by a data visualization advisor, during preparation of a data visualization, to provide a user with recommendations or score values indicative of a quality or complexity of their data visualization.

10. The non-transitory computer readable storage medium of claim 9, wherein the method operates as an expert system, or according to a series of processes or rules, to:

examine the data visualization as defined by its associated JSON, XML, software code, or metadata; and compare the matrix or list of found elements within the data visualization of interest, with the element types and weighting or amount of point values specified by the analytics data visualization score matrix, and provide recommendations associated with the data visualization.

11. The non-transitory computer readable storage medium of claim 9, wherein the data visualization score is displayed within a user interface as a changeable icon and/or score value indicative of a quality and/or complexity associated with the data visualization of interest.

12. The non-transitory computer readable storage medium of claim 9, wherein the method is performed by or within a cloud computing or data analytics environment.

* * * * *